United States Patent
Kondo

(10) Patent No.: US 6,404,924 B1
(45) Date of Patent: *Jun. 11, 2002

(54) IMAGE PROCESSING APPARATUS AND METHOD

(75) Inventor: Tetsujiro Kondo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,502

(22) Filed: Jul. 23, 1998

(30) Foreign Application Priority Data

Jul. 31, 1997 (JP) .............................. 9-205870

(51) Int. Cl.⁷ ................................................ G06K 9/62
(52) U.S. Cl. ....................................... 382/224; 380/217
(58) Field of Search ........................... 382/224; 345/154, 345/507, 509, 508, 526, 603, 530, 555; 364/514; 380/217, 29, 239

(56) References Cited

U.S. PATENT DOCUMENTS

| | | | |
|---|---|---|---|
| 5,452,235 A | * 9/1995 | Isani ........................... 364/514 |
| 5,469,216 A | 11/1995 | Takahashi et al. | |
| 5,568,597 A | 10/1996 | Nakayama et al. | |
| 5,577,203 A | * 11/1996 | Reinert et al. .............. 345/200 |
| 5,598,214 A | 1/1997 | Kondo et al. | |
| 5,859,667 A | 1/1999 | Kondo et al. | |
| 5,930,394 A | 7/1999 | Kondo et al. | |
| 5,933,499 A | * 8/1999 | Enari ........................... 380/10 |
| 5,959,676 A | 9/1999 | Kondo et al. | |
| 5,995,080 A | * 11/1999 | Biro et al. .................. 345/154 |

FOREIGN PATENT DOCUMENTS

| EP | 0 706 154 | 4/1996 |
|---|---|---|
| EP | 9 746 157 | 12/1996 |
| WO | WO96/16380 | 5/1996 |

OTHER PUBLICATIONS

L. Wang, Reduced–difference pyramid: a data structure for progressive image transmission, Optical Engineering, Jul. 1999, vol. 28, No. 7, pp 708–716.

* cited by examiner

Primary Examiner—Andrew W. Johns
Assistant Examiner—Seyed Azariam
(74) Attorney, Agent, or Firm—Frommer Lawrence & Haug LLP; William S. Frommer; Glenn F. Savit

(57) ABSTRACT

An image processing apparatus and method performs processing for finding a first image by using a second image having a smaller number of pixels than the first image and a third image having a smaller number of pixels than the second image. The image processing apparatus and method receives the first image, and classifies reference pixels, which are pixels of the first image being referred to, into predetermined classes in accordance with properties of pixels of the second or third image corresponding to the reference pixels.

22 Claims, 17 Drawing Sheets

IMAGE PROCESSING APPARATUS AND METHOD

BACKGROUND OF THE INVENTION

1. Field of the Invention

The present invention relates to image processing apparatuses and methods, and in particular, to an image processing apparatus and method adapted for, e.g., converting a standard-definition image into a high-definition image.

2. Description of the Related Art

In the case where a standard-definition or low-definition image (hereinafter referred to as an "SD image") is converted into a high-definition image (hereinafter referred to as an "HD image"), or an image is enlarged, a general "interpolation filter" or the like is used to interpolate (compensate) the levels of missing pixels.

Using the interpolation filter to interpolate the pixels however cannot restore components (high-frequency components) of the HD image, which are not included in the SD image. Thus, a high-definition image cannot be obtained.

Accordingly, the present inventor has already proposed an image converting apparatus for converting an SD image into an HD image including high-frequency components which are not included in the SD image.

The image converting apparatus uses linear coupling of an SD image and prediction coefficients to perform adaptive processing for finding the predicted values of pixels in an HD image, whereby high-frequency components not included in the SD image can be restored.

It is assumed that the predicted value E[y] of pixel level y on a pixel (hereinafter referred to as a "HD pixel") included in the HD image is found using a first-order linear coupling model defined by linear coupling of the levels (hereinafter referred to as "learning data") x1, x2 . . . of a plurality of SD pixels, and predetermined prediction coefficients w1, w2 . . . In this case, predicted value E[y] can be expressed by the following equation.

$$E[y] = w_1 x_1 + w_2 x_2 + \ldots \quad (1)$$

Accordingly, for generalization, when matrix W composed of a set of prediction coefficients w, matrix X composed of a set of learning data, and matrix Y' composed of a set of predicted values E[y] are defined as follows:

$$X = \begin{pmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{pmatrix}$$

$$W = \begin{pmatrix} W_1 \\ W_2 \\ \ldots \\ W_n \end{pmatrix}, Y' = \begin{pmatrix} E[y_1] \\ E[y_2] \\ \ldots \\ E[y_m] \end{pmatrix}$$

the following observation equation holds.

$$XW = Y' \quad (2)$$

Next, least squares are applied to the observation equation in order to find predicted value E[y] close to pixel level y of the HD image. In this case, when matrix Y composed of a set of true pixel levels y of the HD pixels as teaching data, and matrix E composed of a set of residuals e of predicted values E[y] corresponding to HD pixel levels y are defined as follows:

$$E = \begin{pmatrix} e_1 \\ e_2 \\ \ldots \\ e_m \end{pmatrix}, Y = \begin{pmatrix} y_1 \\ y_2 \\ \ldots \\ y_m \end{pmatrix}$$

the following equation holds from equations (2).

$$XW = Y + E \quad (3)$$

In this case, prediction coefficient $w_i$ for finding E[y] close to HD-image pixel level y can be found by minimizing the following square error:

$$\sum_{i=1}^{m} e_i^2$$

Therefore, the above square error is differentiated to be zero, in other words, prediction coefficient $w_i$, which satisfies the following equation, is an optimal value for finding predicted value E[y] close to HD-image pixel level y.

$$e_1 \frac{\partial e_1}{\partial w_i} + e_2 \frac{\partial e_2}{\partial w_i} + \ldots + e_m \frac{\partial e_m}{\partial w_i} = 0 \, (i = 1, 2, \ldots, n) \quad (4)$$

Initially, by using prediction coefficient $w_i$ to differentiate equation (3), the following equations hold.

$$\frac{\partial e_i}{\partial w_1} = x_{i1}, \frac{\partial e_i}{\partial w_2} = x_{i2}, \ldots, \frac{\partial e_i}{\partial w_n} = x_{in}, (i = 1, 2, \ldots, m) \quad (5)$$

From equations (4) and (5), equations (6) are obtained.

$$\sum_{i=1}^{m} e_i x_{i1} = 0, \sum_{i=1}^{m} e_i x_{i2} = 0, \ldots \sum_{i=1}^{m} e_i x_{in} = 0 \quad (6)$$

In addition, in view of the relationship among learning data x, a set of prediction coefficients w, residuals e, the following normal equations can be obtained from equations (6).

$$\begin{cases} \left(\sum_{i=1}^{m} x_{i1}x_{i1}\right) w_1 + \left(\sum_{i=1}^{m} x_{i1}x_{i2}\right) w_2 + \ldots + \left(\sum_{i=1}^{m} x_{i1}x_{in}\right) w_n = \left(\sum_{i=1}^{m} x_{i1}y_i\right) \\ \left(\sum_{i=1}^{m} x_{i2}x_{i1}\right) w_1 + \left(\sum_{i=1}^{m} x_{i2}x_{i2}\right) w_2 + \ldots + \left(\sum_{i=1}^{m} x_{i2}x_{in}\right) w_n = \left(\sum_{i=1}^{m} x_{i2}y_i\right) \\ \vdots \\ \left(\sum_{i=1}^{m} x_{in}x_{i1}\right) w_1 + \left(\sum_{i=1}^{m} x_{in}x_{i2}\right) w_2 + \ldots + \left(\sum_{i=1}^{m} x_{in}x_{in}\right) w_n = \left(\sum_{i=1}^{m} x_{in}y_i\right) \end{cases} \quad (7)$$

The number of the normal equations as equations (7) that can be formed is identical to the number of sets of prediction coefficients w to be found. Thus, by solving equations (7), sets of optimal coefficients w can be found. (To solve equations (7), it is required in equations (7) that a matrix composed of coefficients as to sets of prediction coefficients w be nonsingular) For solving equations (7), for example, sweeping (Gauss-Jordan elimination) etc. can be applied.

Finding sets of optimal prediction coefficients w in the above manner and using the found sets of prediction coefficients w in equation (1) to find predicted values E[y] close to HD-image pixel levels y is adaptive processing. Adaptive processing differs from interpolation in that components included in the HD image which are not included in the SD image are reproduced. In other words, from only equations (1), it is found that the adaptive processing is identical to interpolation with a general "interpolation filter". However, since sets of prediction coefficients w corresponding to tap coefficients of the interpolation filter are found by learning with teaching data y, the components included in the HD image can be reproduced. In other words, a high-definition image can be easily obtained. From this fact, it may be said that the adaptive processing has the function of creating an image (definition).

FIG. 12 shows a block diagram of an image converting apparatus for using the above-described adaptive processing to convert an SD image into an HD image.

An SD image is supplied to a classification unit 201 and an adaptive processing unit 204. The classification unit 201 includes a class-tap generating circuit 202 and a classification circuit 203, and classifies HD pixels (HD pixels being referred to)(hereinafter referred to as "reference pixels"), as to which predicted values are found, into predetermined classes based on the properties of SD-image pixels corresponding to the reference pixels.

In other words, in the class-tap generating circuit 202, SD pixels corresponding to the reference pixels, which are used to classify the reference pixels (hereinafter referred to as "class-taps"), for example, a plurality of SD pixels having predetermined positional relationships with respect to the reference pixels are extracted from the SD image supplied to the classification unit 201, and they are supplied to the classification circuit 203. The classification circuit 203 detects the pattern (pixel-level distribution) of SD pixel levels constituting the class-taps from the class-tap generating circuit 202, and supplies a pre-assigned value to the pattern as a reference pixel class to the adaptive processing unit 204.

Specifically, by way of example, it is assumed that the HD image is composed of pixels (HD pixels) indicated by symbols × in FIG. 13, and the SD image is composed of pixels (SD pixels) indicated by symbols ○ in FIG. 13. In FIG. 13, the SD image has half the number of horizontal or vertical pixels as the HD image. In FIG. 13 (similarly to FIG. 14 to FIG. 16 described below), the SD pixel (indicated by ○ in FIG. 13) at the (i+1)-th position from the left and the (j+1)-th position from the top is denoted by $X_{i,j}$, and similarly, the HD pixel (indicated by × in FIG. 13) at the (i'+1)-th position from the left and the (j'+1)-th position from the top is denoted by $Y_{i,j}$. In this case, the position of SD pixel $X_{i,j}$ and the position of HD pixel $Y_{2i,2j}$ are the same.

Here, if it is assumed that one SD pixel, for example, HD pixel $Y_{4,4}$ positioned identically to $X_{2,2}$ is a reference pixel, the class-tap generating circuit 202 extracts and uses as the class tap of the reference pixel (HD pixel) $Y_{4,4}$, for example, 3×3 (horizontal×vertical) SD pixels $X_{1,1}$, $X_{2,1}$, $X_{3,1}$, $X_{1,2}$, $X_{2,2}$, $X_{3,2}$, $X_{1,3}$, $X_{2,3}$, and $X_{3,3}$ (SD pixels in the area defined by the dotted line in FIG. 13) which have SD pixel $X_{2,2}$ as the center, having possible correlation with HD pixel $Y_{4,4}$ positioned identically to HD pixel $Y_{4,4}$.

In the case where, for example, HD pixel $Y_{5,4}$ on the right of HD pixel $Y_{4,4}$ positioned identically to $X_{2,2}$ is used as a reference pixel, the class-tap generating circuit 202 extracts SD pixels corresponding to HD pixel $Y_{5,4}$, for example, nine SD pixels, surrounded by the dotted line in FIG. 14, including SD pixel $X_{4,2}$ in place of SD pixel $X_{1,2}$ in the class tap formed when HD pixel $Y_{4,4}$ is used as a reference pixel, and the nine SD pixels are used as the class tap of the reference pixel (HD pixel) $Y_{5,4}$.

In the case where, for example, HD pixel $Y_{4,5}$ adjacent to HD pixel $Y_{4,4}$ positioned identically to $X_{2,2}$ is used as a reference pixel, the class-tap generating circuit 202 extracts SD pixels corresponding to HD pixel $Y_{4,5}$, for example, nine SD pixels, surrounded by the dotted line in FIG. 15, including SD pixel $X_{2,4}$ in place of SD pixel $X_{2,1}$ in the class tap formed when HD pixel $Y_{4,4}$ is used as a reference pixel, and the nine SD pixels are used as the class tap of reference pixel (HD pixel) $Y_{4,5}$.

In the case where, for example, HD pixel $Y_{5,5}$ adjacent below to obliquely right HD pixel $Y_{4,4}$ is used as a reference pixel, the class-tap generating circuit 202 extracts SD pixels corresponding to HD pixel $Y_{5,5}$, for example, nine SD pixels, surround by the dotted line in FIG. 16, including SD pixel $X_{4,4}$ in place of SD pixel $X_{1,1}$ in the class tap formed when HD pixel $Y_{4,4}$ is used as a reference pixel, and the nine SD pixels are used as the class tap of the reference pixel (HD pixel) $Y_{5,5}$.

The classification circuit 203 detects the pattern of the nine SD pixels (pixel levels) as a class tap, and outputs a value corresponding to the pattern as a reference pixel class.

This class is supplied to the address terminal (AD) of a coefficient read only memory (ROM) 207 in the adaptive processing unit 204.

In general, eight bits or the like are assigned to one pixel included in an image. If eight bits are assigned to one SD pixel, the number of pixel level patterns in only the square class tap composed of 3×3 pixels shown in FIG. 13 is as extremely large as $(2^8)^9$, so that rapid post-processing cannot be performed.

Accordingly, before classification is performed, the pre-processing of the class tap is performed using, for example, adaptive dynamic range coding (ADRC) for reducing the number of bits of SD pixels constituting the class tap.

According to ADRC, a pixel having a maximum level (hereinafter referred to as a "maximum pixel") and a pixel having a minimum level (hereinafter referred to as a "minimum pixel") are detected from the nine SD pixels constituting the class tap. The difference DR (=MAX−MIN) between the maximum pixel level MAX and the minimum pixel level MIN is computed, and the DR is used as a local dynamic range of the class tap. Based on the dynamic range DR, each pixel level of the class tap is requantized to K bits, which is less than the number of the originally assigned bits. In other words, the minimum pixel level MIN is subtracted from the respective pixel levels of the class tap, and the subtracted values are divided by $DR/2^K$.

As a result, each pixel level of the class tap can be expressed by K bits. Accordingly, when K=1, the number of patterns of the nine SD pixel levels is $(2^1)^9$. Compared with the case where ADRC is not performed, the number of the patterns can be extremely reduced.

In addition, the adaptive processing unit 204 includes a prediction-tap generating circuit 205, a prediction computation circuit 206, and the coefficient ROM 207, and performs adaptive processing.

The predicted-tap generating circuit 205 extracts from an SD image supplied to the adaptive processing unit 204 a plurality of SD pixels having a predetermined positional relationship with respect to a reference pixel, which are used in the prediction computation circuit 206 to find a predicted value of the reference pixel, and supplies them as a prediction tap to the prediction computation circuit 206.

Specifically, in the case where, HD pixel $Y_{4,4}$ is used as a reference pixel, and a class tap as described using FIG. 13 is formed, the prediction tap generation circuit 205 extracts SD pixels that may have high correlation with, e.g., HD pixel $Y_{4,4}$, for example, 5×5 SD pixels (in the area all defined by the solid line in FIG. 13) having SD pixel $X_{2,2}$ as the center, which is positioned identically to the reference pixel $Y_{4,4}$, and the SD pixels are used as the prediction tap of the reference pixel (HD pixel) $Y_{4,4}$.

In the case where, for example, HD pixel $Y_{5,4}$ is used as a reference pixel, the prediction-tap generating circuit 205 extracts 25 SD pixels surrounded by the solid line in FIG. 14 which include SD pixel $X_{5,2}$ in place of SD pixel $X_{0,2}$ in the prediction tap formed when HD pixel $Y_{4,4}$ is used as a reference pixel, and the 25 SD pixels are used as the class tap of the reference pixel (HD pixel) $Y_{5,4}$.

In the case where, for example, HD pixel $Y_{4,5}$ is used as a reference pixel, the prediction-tap generating circuit 205 extracts 25 SD pixels surrounded by the solid line in FIG. 15 which include SD pixel $X_{2,5}$ in place of SD pixel $X_{2,0}$ in the prediction tap formed when HD pixel $Y_{4,4}$ is used as a reference pixel, and the 25 SD pixels are used as the class tap of the reference pixel (HD pixel) $Y_{4,5}$.

In the case where, for example, HD pixel $Y_{5,5}$ is used as a reference pixel, the prediction-tap generating circuit 205 extracts 25 SD pixels surrounded by the solid line in FIG. 16 which include SD pixel $X_{5,5}$ in place of SD pixel $X_{0,0}$ in the class tap formed when HD pixel $Y_{4,4}$ is used as a reference pixel, and the 25 SD pixels are used as the class tap of the reference pixel (HD pixel) $Y_{5,5}$.

In addition, the prediction taps from the prediction-tap generating circuit 205, and the sets of prediction coefficients from the coefficient ROM 207 are supplied to the prediction computation circuit 206.

The coefficient ROM 207 holds the sets of prediction coefficients found by performing learning beforehand for classes. When being supplied with a class from the classification circuit 203, it reads a prediction coefficient stored in the address corresponding to the class, and supplies the read coefficient to the prediction computation circuit 206.

In this manner, the prediction computation circuit 206 is supplied with the prediction tap corresponding to a reference pixel and a set of prediction coefficients as to the reference pixel class. The prediction computation circuit 206 implements the computation shown in equation (1) using prediction coefficients w, $w_2$, . . . from the coefficient ROM 207 and (SD pixels constituting) prediction taps $x_1$, $x_2$, . . . from the prediction-tap generating circuit 6, whereby the predicted value E[y] of the reference pixel (HD pixel) is found, and it is output as an HD pixel level.

The foregoing processing is performed with all HD pixels used as reference pixels, whereby an SD image is converted into an HD image. The class-tap generating circuit 202 and the prediction-tap generating circuit 205 use an identical HD pixel in processing.

FIG. 17 shows a block diagram of a learning apparatus that performs learning for computing sets of prediction coefficients for classes which are stored in the coefficient ROM 207 in FIG. 12.

An HD image to be teaching data y in learning is supplied to a decimation circuit 211 and a teaching data extracting circuit 146. In the decimation circuit 211, the HD image is reduced by decimating the number of its pixels, whereby an SD image is formed. In other words, the decimation circuit 211 reduces the numbers of horizontal and vertical pixels of the HD image to form the SD image. The SD image is supplied to a classification unit 212 and a prediction-tap generating circuit 145.

The classification unit 212 or the prediction-tap generating circuit 145 performs processing identical to that in the classification unit 201 or the prediction-tap generating circuit 205, thereby outputting the class or prediction tap of the reference pixel. The class output from the classification unit 212 is supplied to the address terminals (AD) of a prediction tap memory 147 and a data memory 148, and the prediction tap output from the prediction-tap generating circuit 145 is supplied to the prediction tap memory 147. The classification unit 212 and the prediction-tap generating circuit 145 use an identical HD pixel as a reference pixel.

In the prediction tap memory 147, the prediction tap supplied from the prediction-tap generating circuit 145 is stored at the address corresponding to the class supplied from the classification unit 212.

In addition, the teaching data extracting circuit 146 extracts HD pixels that are used as reference pixels in the prediction-tap generating circuit 145 from the supplied HD image, and supplies them as teaching data to the teaching data memory 148.

In the teaching data memory 148, the teaching data supplied from the teaching data extracting circuit 146 are stored at the address corresponding to the class supplied from the classification circuit 146.

The foregoing processing is performed while the HD pixels of all HD images prepared beforehand for learning are being successively used as reference pixels.

As a result, at an identical address of the teaching data memory 148 or the prediction tap memory 14, HD pixels in the class corresponding to the address, or SD pixels positioned so that the prediction tap described in FIGS. 13 to 16 are stored as teaching data y or learning data x.

The prediction tap memory 147 and the teaching data memory 148 hold a plurality of information data at one identical address, whereby, at the identical address, a plurality of learning data x and teaching data y which are classified into one identical class can be stored.

Subsequently, the arithmetic circuit 149 reads from the prediction tap memory 147 or the teaching data memory 148, HD pixels as a prediction tap or a teaching data, stored in the identical address, and uses them to compute sets of prediction coefficients for minimizing the error between the predicted data and the teaching data by least squares. In other words, in the arithmetic circuit 149, the normalization equations (7) hold for each class. By solving these, sets of prediction coefficients are found.

In the above manner, the sets of prediction coefficients for each class, found by the arithmetic circuit 149, are stored at an address corresponding to each class in the coefficient ROM 207 in FIG. 12.

In the above-described learning, there may a case where a class in which normalization equations needed for sets of prediction coefficients are not obtained. Concerning such a class, for example, sets of prediction coefficients etc. obtained by establishing normalization equations, regardless of classes, are used as sets of default prediction coefficients.

According to adaptive processing, an HD image including high-frequency components which are not included in the original SD image can be obtained. By performing classification for reference pixels, and using prediction coefficients in accordance with the obtained classes to perform adaptive processing, adaptive processing suitable for the reference pixels can be performed.

In addition, in the above-described image processing apparatus (FIG. 12) and learning apparatus (FIG. 17), a class tap consists of SD pixels having a positional Ian relationship (described in FIGS. 13 to 16) with respect to a reference pixel, regardless of image characteristics.

In other words, the class tap consists of nine SD pixels close to the reference pixel as described in FIGS. 13 to 16.

In addition, an image can be divided into regions composed of pixels having approximate brightness levels, colors, and so forth: namely, a region in which a predetermined object is displayed, and regions having predetermined colors and patterns. Accordingly, by performing the above-described classification for a region different from others in the image, there may be a case in which all reference pixels in, e.g., a portion having almost no pixel change are classified into one identical class.

However, by performing classification for such a portion so that, for example, SD pixels away from the reference pixels are included in the class tap, reference pixels classified into an identical class may be classified into different classes. In other words, by forming a class tap with SD pixels in a broader range, the reference pixels may be classified into classes adapted for the reference pixels.

If reference pixels can be classified into classes suitable for the reference pixels as described above, adaptive processing more suitable for the reference pixels can be performed, and the quality of the resultant HD image can be increased.

SUMMARY OF THE INVENTION

Accordingly, it is an object of the present invention to provide an image processing apparatus and method that enables image quality improvement by solving the above-described problems.

To this end, according to an aspect of the present invention, the foregoing object has been achieved through provision of an image processing apparatus for performing processing for finding a first image by using a second image having a smaller number of pixels than the first image and a third image having a smaller number of pixels than the second image, the image processing apparatus including: a receiving unit for receiving the first image; and a classification unit for classifying reference pixels, which are pixels of the first image being referred to, into predetermined classes in accordance with properties of pixels of the second or third image corresponding to the reference pixels.

According to another aspect of the present invention, the foregoing object has been achieved through provision of an image processing method for performing processing for finding a first image by using a second image having a smaller number of pixels than the first image and a third image having a smaller number of pixels than the second image, the image processing method including the steps of: receiving the first image; and classifying reference pixels, which are pixels of the first image being referred to, into predetermined classes in accordance with properties of pixels of the second or third image corresponding to the reference pixels.

According to an image processing apparatus and image processing method of the present invention, reference pixels as pixels of a first image being referred to are classified into predetermined classes in accordance with properties of second or third image pixels corresponding to the reference pixels. Thus, the reference pixels can be classified into more suitable classes.

DESCRIPTION OF THE PREFERRED EMBODIMENTS

Embodiments of the present invention will be described below.

Figure 1:
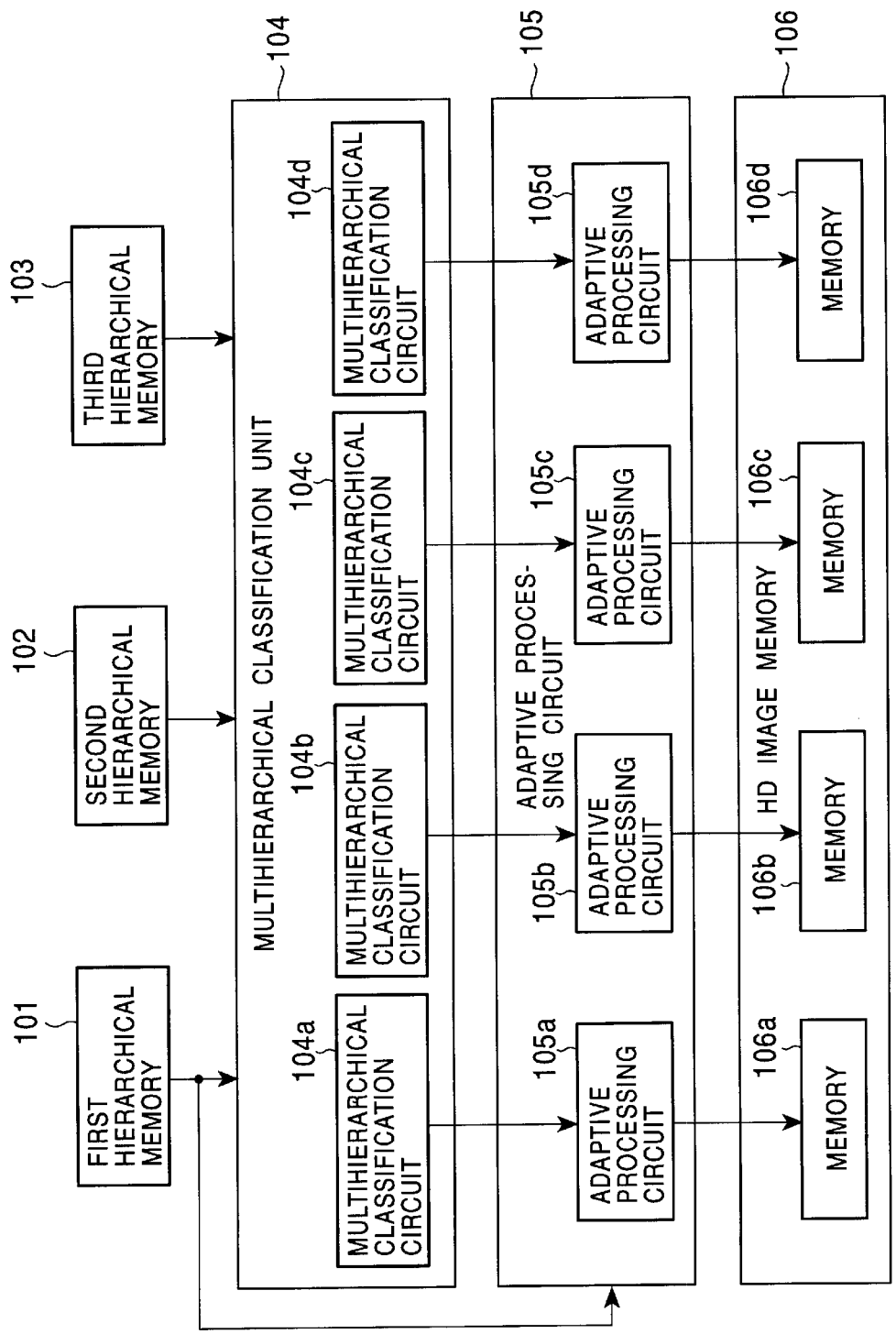
FIG. 1 is a block diagram showing one embodiment of an image processing apparatus to which the present invention is applied.

FIG. 1 shows one embodiment of an image processing apparatus to which the present invention is applied.

This image processing apparatus processes a plurality of SD images (second and third images) having different numbers of pixels, thereby generating an HD image (first image)(whose image definition is also high) having a larger number of pixels than that of the SD images.

Specifically, in a first hierarchical memory 101, a second hierarchical memory 102 and a third hierarchical memory 103, first to third hierarchical SD images are respectively stored. Compared with the first hierarchical SD image, the second hierarchical SD image has a smaller number of pixels than the first hierarchical SD image, and the third hierarchical SD image has a smaller number of pixels than the second hierarchical SD image.

The first hierarchical SD image stored in the first hierarchical memory 101, the second hierarchical SD image stored in the second hierarchical memory 102, and the third hierarchical SD image stored in the third hierarchical memory 103 are each supplied to a multihierarchical classification unit 104. The first hierarchical SD image stored in the first hierarchical memory 101 is also supplied to an adaptive processing unit 105.

The multihierarchical classification unit 104 includes multihierarchical classification circuits 104a to 104d, and performs multihierarchical classification (as a type of classification) of reference pixels as HD pixels based on predicted values found by adaptive processing, using those which correspond to the reference pixels among pixels constituting the respective first to third hierarchical images from the first hierarchical memory 101, the second hierarchical memory 102 and the third hierarchical memory 103.

In this embodiment, an HD image having, for example, a number of pixels which is twice the number of horizontal and vertical pixels of the first hierarchical SD image is generated. In this case, as described above with god reference to FIG. 13 to FIG. 16, for one SD pixel (first hierarchical SD pixel, here), it is necessary to generate a total of four HD pixels, namely, one HD pixel positioned identically to the one SD pixel and three HD pixels adjacently positioned on the right, lower side, and diagonally right lower side of the one HD pixel. In other words, four HD pixels need to be generated for one first hierarchical SD pixel. Accordingly, in order to perform simultaneous classification (multihierarchical classification) of the four HD pixels, the multihierarchical classification unit 104 consists of four multihierarchical classification circuits 104a to 104d.

The results obtained by classifying the four reference pixels, from the multihierarchical classification circuits 104a to 104d, are supplied to the adaptive processing unit 105. The adaptive processing unit 105 also consists of four adaptive processing circuits 105a to 105d, for the same reason for which the multihierarchical classification unit 104 consists of the four multihierarchical classification circuits 104a to 104d. The respective multihierarchical classification circuits 104a to 104d perform adaptive processes corresponding to the classification results from the multihierarchical classification circuits 104a to 104d, thereby finding predicted values for the four reference pixels. The predicted values found by the adaptive processing circuits 105a to 105d are supplied and stored in an HD image memory 106.

Similarly to the multihierarchical classification unit 104 and the adaptive processing unit 105, the HD image memory 106 consists of four memories 106a to 106d. In the memories 106a to 106d, the predicted values supplied from the adaptive processing units 105a to 105d are respectively stored.

Here, for an HD pixel positioned identically to one first hierarchical SD pixel, the multihierarchical classification circuit 104a or the adaptive processing circuit 105a performs multihierarchical classification or adaptive processing, and the predicted value obtained is stored in the memory 106a. In addition, for HD pixels adjacently positioned on the right, lower side and diagonally right lower side of an HD pixel positioned identically to the first hierarchical SD pixel, the multihierarchical classification circuit 104b and the adaptive processing circuit 105b, the multihierarchical classification circuit 104c and the adaptive processing circuit 105c, or the multihierarchical classification circuit 104d and the adaptive processing circuit 105d perform processing. The predicted values obtained are stored in memories 106b to 106d.

Next, before describing the details of the multihierarchical classification unit 104 and the adaptive processing unit 15, a technique for generating the first to third hierarchical SD images, which are respectively stored in the first hierarchical memory 101, the second hierarchical memory 102 and the third hierarchical memory 103, will be described.

Figure 2:
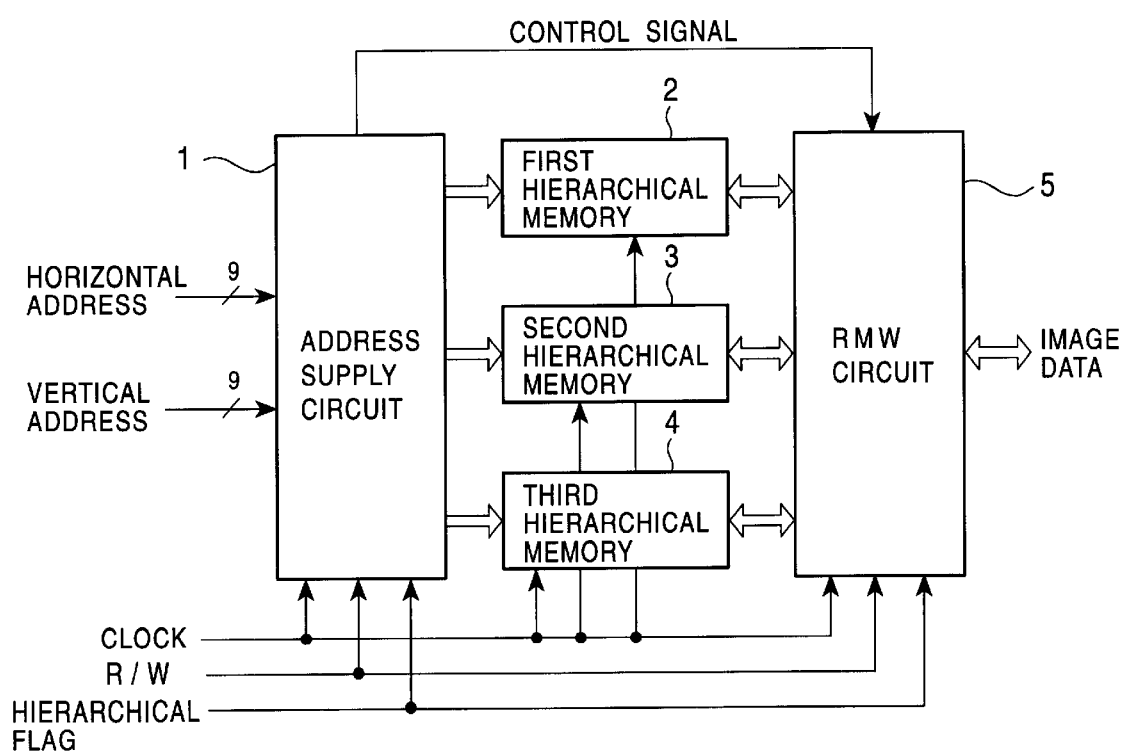
FIG. 2 is a block diagram showing a storage unit for generating first to third hierarchical SD images.

FIG. 2 shows a block diagram of a storage unit for generating first to third hierarchical SD images. This storage unit includes, for example, one-chip complementary metal oxide semiconductors (CMOS), and performs three hierarchical encodings in which an input SD image is used as a first hierarchical SD image, and a second hierarchical SD image having a smaller number of pixels than the first hierarchical SD image and a third hierarchical SD image having a smaller number of pixels than the second hierarchical SD image are generated.

Specifically, horizontal addresses or vertical addresses as the addresses corresponding to the horizontal or vertical positions of SD pixels constituting an image to be input to the storage unit are supplied to an address supply circuit 1.

Figure 3:
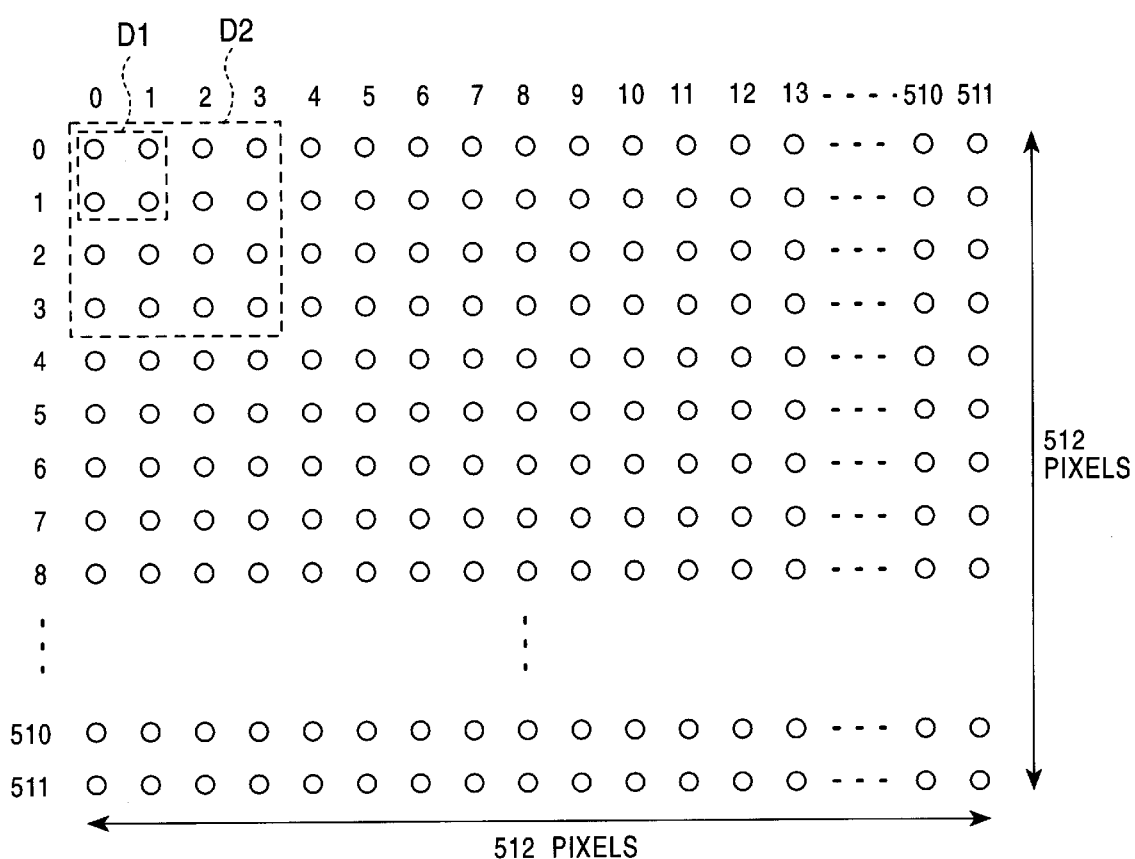
FIG. 3 is a drawing showing the structure of one first hierarchical SD image.

In this embodiment, an image (digital image data) having 512 pixels in its horizontal direction and 512 lines in its vertical direction as shown in FIG. 3 is input as a first hierarchical SD image. Thus, the horizontal addresses and the vertical addresses are each expressed using nine ($=\log_2 512$) bits.

In addition, in this embodiment, as described above, the HD image having a number of pixels which is double that the horizontal and vertical pixels of the first hierarchical image is generated. Thus, one HD image is composed of 1024×1024 pixels.

The address supply circuit 1 processes the input horizontal and vertical addresses as required, and supplies them to a first hierarchical memory 2, a second hierarchical memory 3 and a third hierarchical memory 4. In addition to the horizontal addresses and the vertical addresses, a clock (not shown in FIG. 4 to FIG. 6 described below), a read/write (R/W) signal, and a hierarchical flag are supplied to the address supply circuit 1. While being synchronized with the clock, the address supply circuit 1 supplies the addresses to the first hierarchical memory 2, the second hierarchical memory 3 and the third hierarchical memory 4. The address supply circuit 1 processes the supplied horizontal addresses and vertical addresses in accordance with the R/W signal and the hierarchical flag. The address supply circuit 1 supplies a predetermined control signal to a read-modify-write circuit (RMW) 5 if necessary.

The R/W signal controls the reading of image data from the storage unit or the writing of image data to the storage unit. The hierarchical flag is, for example, a 2-bit flag to control the reading of any one of the first to third hierarchical SD images when images stored in the storage unit are read. The image data are simultaneously written in, for example, the first hierarchical memory 2, the second hierarchical memory 3 and the third hierarchical memory 4, so that the hierarchical flag is ignored (has no meaning) when the R/W signal represents writing. In addition, reading from the first hierarchical memory 2, the second hierarchical memory 3 and the third hierarchical memory 4 is respectively performed, so that the hierarchical flag is valid only when reading is performed. However, reading from the first hierarchical memory 2, the second hierarchical memory 3 and the third hierarchical memory 4 can be simultaneously performed. In this case, the hierarchical flag does not need to be used.

The first hierarchical memory 2 stores the image data supplied from the RMW circuit 5 at an address designated by the address supply circuit 1, and reads and outputs the image data stored at the address to the RMW circuit 5. The first hierarchical memory 2 can hold the first hierarchical SD image, namely, image data to be input to the storage unit. The first hierarchical memory 2 can hold at least one first hierarchical SD image, namely, 512×512 pixel image data, as shown in FIG. 2. A memory cell included in the first hierarchical memory 2 has a data length identical to the number of bits assigned to pixels constituting the first hierarchical SD image. In other words, when pixels constituting the first hierarchical SD image are expressed by, for example, eight bits, the memory cell included in the first hierarchical memory 2 has at least a data length of eight bits.

The second hierarchical memory 3 stores image data supplied from the RMW circuit 5 at an address designated by the address supply circuit 1, and reads and outputs the image data stored at the address to the RMW circuit 5. The second hierarchical memory 3 can hold the second SD image. In this embodiment, the sum of four (2×2 (horizontal×vertical)) adjacent pixels included in the first hierarchical SD image is used as, for example, one second hierarchical pixel. The second hierarchical memory 3 can hold a second hierarchical SD image which includes such a pixel. The second hierarchical memory 3 has a storage capacity in which at least one second hierarchical SD image can be stored. In other words, here, one second hierarchical pixel is formed from the 2×2 first hierarchical pixels. Thus, the second hierarchical SD image consists of 256×256 (=512/2×512/2) pixels. Accordingly, the second hierarchical memory 2 can hold the second hierarchical SD image, which has such a number of pixels. A memory cell included in the second hierarchical memory 3 has a data length that makes it possible to store at least the pixels constituting the second hierarchical SD image without overflow. In other words, since a first hierarchical pixel is expressed by eight bits in this embodiment, a second hierarchical pixel as the sum of four pixels having the eight bits is expressed by ten (=$\log_2$($2^8+2^8+2^8+2^8$)) bits. Accordingly, the memory cell included in the second hierarchical memory 3 has a data length of at least ten bits.

The third hierarchical memory 4 stores image data supplied from the RMW circuit 5 at an address designated by the address supply circuit 1, and reads and outputs the image data stored at the address to the RMW circuit 5. The third hierarchical memory 4 can hold the third hierarchical SD image. In this embodiment, the four (2×2) adjacent pixels included in the second hierarchical SD image, in other words, the sum of 4×4 pixels included in the first hierarchical SD image is used as one third hierarchical pixel. The third hierarchical memory 4 is designed so that the third hierarchical SD image, which includes such pixels, can be stored. The third hierarchical memory 4 has a storage capacity that makes it possible to store at least one third hierarchical SD image. Here, one third hierarchical pixel is formed from the 2×2 second hierarchical pixels. Thus, the third hierarchical SD image consists of 128×128 (=256/2× 256/2) pixels. Accordingly, the third hierarchical memory 4 is designed so that the third hierarchical SD image having such a number of pixels can be at least stored. The memory cell included in the third hierarchical memory 4 has a data length that makes it possible to store the pixels constituting the third hierarchical SD image can be at least stored without overflow. In other words, in this embodiment, a second hierarchical pixel is expressed by ten bits as described above. Thus, a third hierarchical pixel as the sum of four pixels having the ten bits is expressed by twelve (=$\log_2$($2^{10}+2^{10}+2^{10}+2^{10}$)) bits. Therefore, the memory cell included in the third hierarchical memory 4 has at least a data length of twelve bits.

The clock is supplied to the first hierarchical memory 2, the second hierarchical memory 3, and the third hierarchical memory 4, and data are read or written so as to be synchronized with the supplied clock.

The RMW circuit 5 writes the image data supplied to the storage unit as a first hierarchical SD image in the first hierarchical memory 2. The RMW circuit 5 performs computing a second hierarchical SD image from the first hierarchical SD image, and writes it in the second hierarchical memory 3. The RMW circuit 5 also performs computing a third hid hierarchical SD image from the first hierarchical SD image (or second hierarchical SD image), and writes it in the third hierarchical memory 4. The RMW circuit 5 reads and outputs the respective image data stored in the first hierarchical memory 2, the second hierarchical memory 3 and the third hierarchical memory 4. The clock, the R/W signal, the hierarchical flag, the control signal output by the address supply circuit 1 are supplied to the RMW circuit 5, and the RMW circuit 5 performs various processes based on the R/W signal, the hierarchical flag, and the control signal while being synchronized with the clock.

Next, its operation will be described with reference to FIG. 3 to FIG. 5.

Here, as shown in the above-described FIG. 3, it is assumed that one image consists of 512×512 pixels and the image data with each pixel expressed by eight bits are supplied as the first hierarchical SD image to the storage unit. In addition, the image data are supplied as a result of generally called "progressive scanning".

Among pixels constituting the first hierarchical SD image, the top leftmost pixel is expressed as h(0,0), and similarly, a pixel that is the (x+1)-th from the left and the (y+1)-th from the top is expressed as h(x,y). Since the first hierarchical SD image consists of 512×512 pixels as described above, x and y each take an integer between 0 to 511 (=$2^9-1$).

When it is assumed that there are variables s and t which take an integer between 0 and 255(=$2^9/2-1$), a pixel included in the second hierarchical SD image is the sum of 2×2 adjacent first hierarchical pixels, h(2s,2t), h(2s+1,2t), h(2s,2t+1), and h(2s+1,2t+1). The sum is expressed as m(s,t). Accordingly, the equation $$m(s,t)=h(2s,2t)+h(2s+1,2t)+h(2s,2t+1)+h(2s+1,2t+1) \quad (8)$$

holds.

In addition, when it is assumed that there are variables m and n which take an integer between 0 and 127(=$2^9/4-1$), a pixel included in the third hierarchical SD image is the sum of 2×2 adjacent second hierarchical pixels, m(2m,2n), m(2m+1,2n), m(2m,2n+1), and m(2m+1,2n+1), in other words, the sum of 4×4 adjacent first hierarchical pixels, h(4m,4n), h(4m+1,4n), h(4m+2,4n), h(4m+3,4n), h(4m, 4n+1), h(4m+1,4n+1), h(4m+2,4n+1), h(4m+3,4n+1), h(4m,4n+2), h(4m+1,4n+2), h(4m+2,4n+2), h(4m+3, 4n+2), h(4m,4n+3), h(4m+1,4n+3), h(4m+2,4n+3), and h(4m+3,4n+3)

This is expressed as q(m,n). Accordingly, the equation $$q(m, n) = \quad (9)$$
$$m(2m, 2n) + m(2m + 1, 2n) + m(2m, 2n + 1) + m(2m + 1, 2n + 1) =$$
$$h(4m, 4n) + h(4m + 1, 4n) + h(4m + 2, 4n) + h(4m + 3, 4n) +$$
$$h(4m, 4n + 1) + h(4m + 1, 4n + 1) + h(4m + 2, 4n + 1) +$$
$$h(4m + 3, 4n + 1) + h(4m, 4n + 2) + h(4m + 1, 4n + 2) +$$
$$h(4m + 2, 4n + 2) + h(4m + 3, 4n + 2) + h(4m, 4n + 3) +$$
$$h(4m + 1, 4n + 3) + h(4m + 2, 4n + 3) + h(4m + 3, 4n + 3)$$

holds.

In any cases where data are written and read, combinations (HA,VA) of horizontal addresses HA and vertical addresses VA are supplied to the address supply circuit 1 in the order (corresponding to progressive scans) of (0,0), (1,0),..., (511,0),
(0,1), (1,1), . . . , (511,1),
(511,0), (511,1), . . . , (511,511),
while synchronizing with the clock.

The respective bits of one horizontal address HA, which has nine bits, are expressed as ha1, ha2, . . . , ha8 (ha8 is the most significant bit), with the least significant bit expressed as ha0. Similarly, the respective bits of one vertical address VA, which has nine bits, are expressed as va1, va2, . . . , va8 (vaB is the most significant bit), with the least significant bit expressed as va0.

In addition, when the image data are written in the storage unit, the first hierarchical SD image, which has been progressively scanned, is supplied to the RMW circuit 5 in synchronization with the clock, and in accordance with this, the horizontal addresses HA and the vertical addresses VA are supplied to the address supply circuit 1 as described above.

In this case, the first hierarchical memory 2 is accessed in the following manner.

Figure 4:
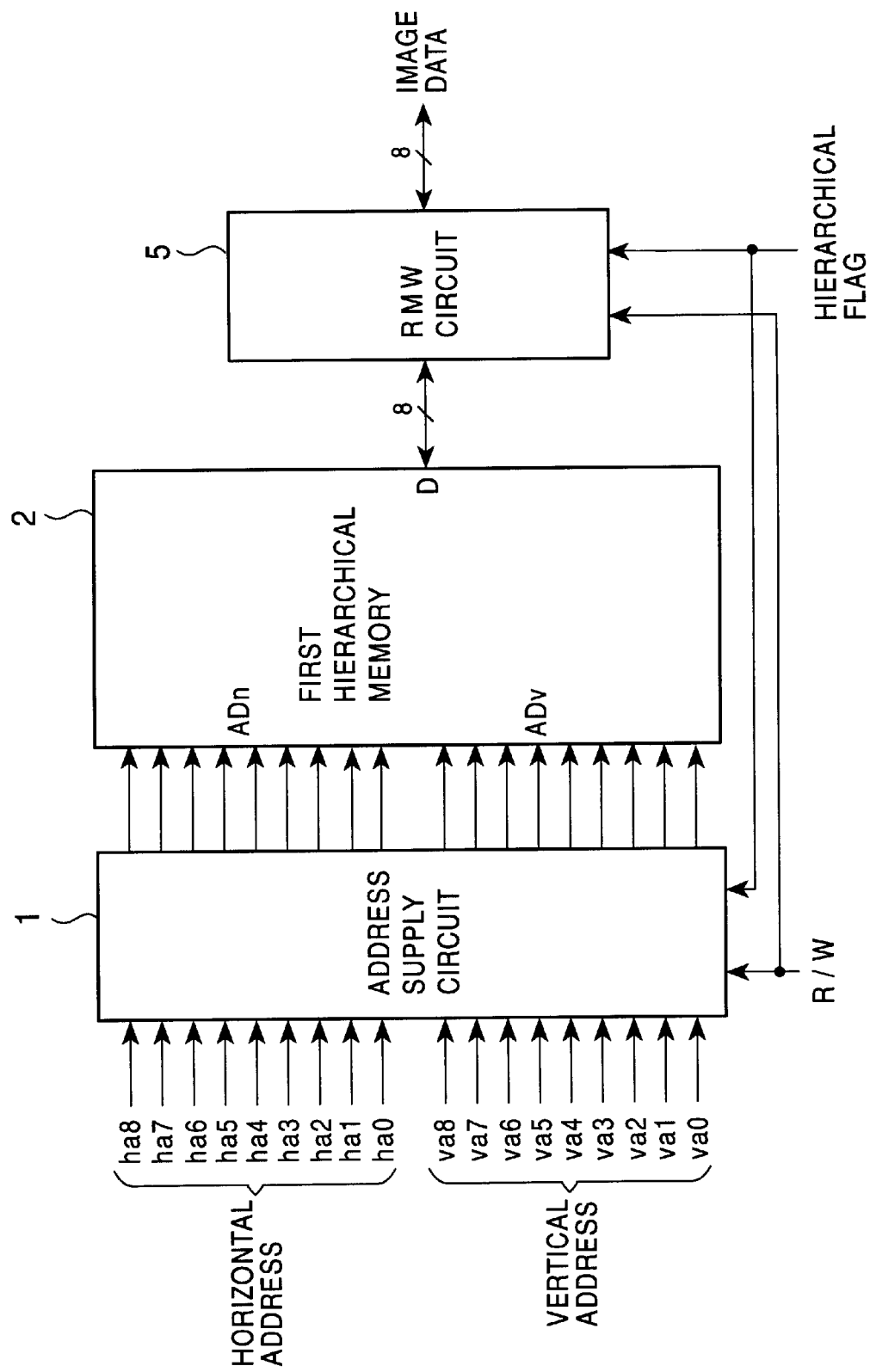
FIG. 4 is a block diagram showing a first functional example of the storage unit shown in FIG. 2.

As shown in FIG. 4, when writing is performed (in the case where the R/W signal represents writing), the address supply circuit 1 supplies supplied horizontal addresses HA and vertical addresses VA to the address terminals (ADh, ADv) of the first hierarchical memory 2, without changing them. The RMW circuit 5 writes the supplied first hierarchical SD image data (SD pixels (pixel levels)) in memory cells (not shown) of the first hierarchical memory 2, designated by the horizontal addresses HA and the vertical addresses VA. The same processing is successively performed, whereby one first hierarchical SD image, which consists of 512×512 pixels, is stored in the first hierarchical memory 2. Thereby, in the first hierarchical memory 2, at addresses:

(0,0), (1,0), . . . , (511,0),
(0,1), (1,1), . . . , (511,1),
. . .
(511,0), (511,1), . . . , and (511,511),
the first hierarchical pixels (pixel levels):
h(0,0), h(1,0), . . . , h(511,0),
h(0,1), h(1,1), . . . , h(511,1),
. . .
h(511,0), h(511,1), . . . , and h(511,511)
are stored, respectively.

When reading is performed (in the case where the R/W signal represents reading), if the hierarchical flag represents the first hierarchical level, the address supply circuit 1 similarly supplies supplied horizontal addresses HA and vertical addresses VA to the address terminals of the first hierarchical memory 2, without changing them. The RMW circuit 5 reads the first hierarchical SD image data stored at the memory cells designated by the horizontal addresses HA and the vertical addresses VA, and the same processing is successively performed, whereby one first hierarchical SD image composed of 512×512 pixels is read from the first hierarchical memory 2. Thereby, the first hierarchical SD image, which has been progressively scanned, is output.

Next, access to the second hierarchical memory 3 will be described.

Figure 5:
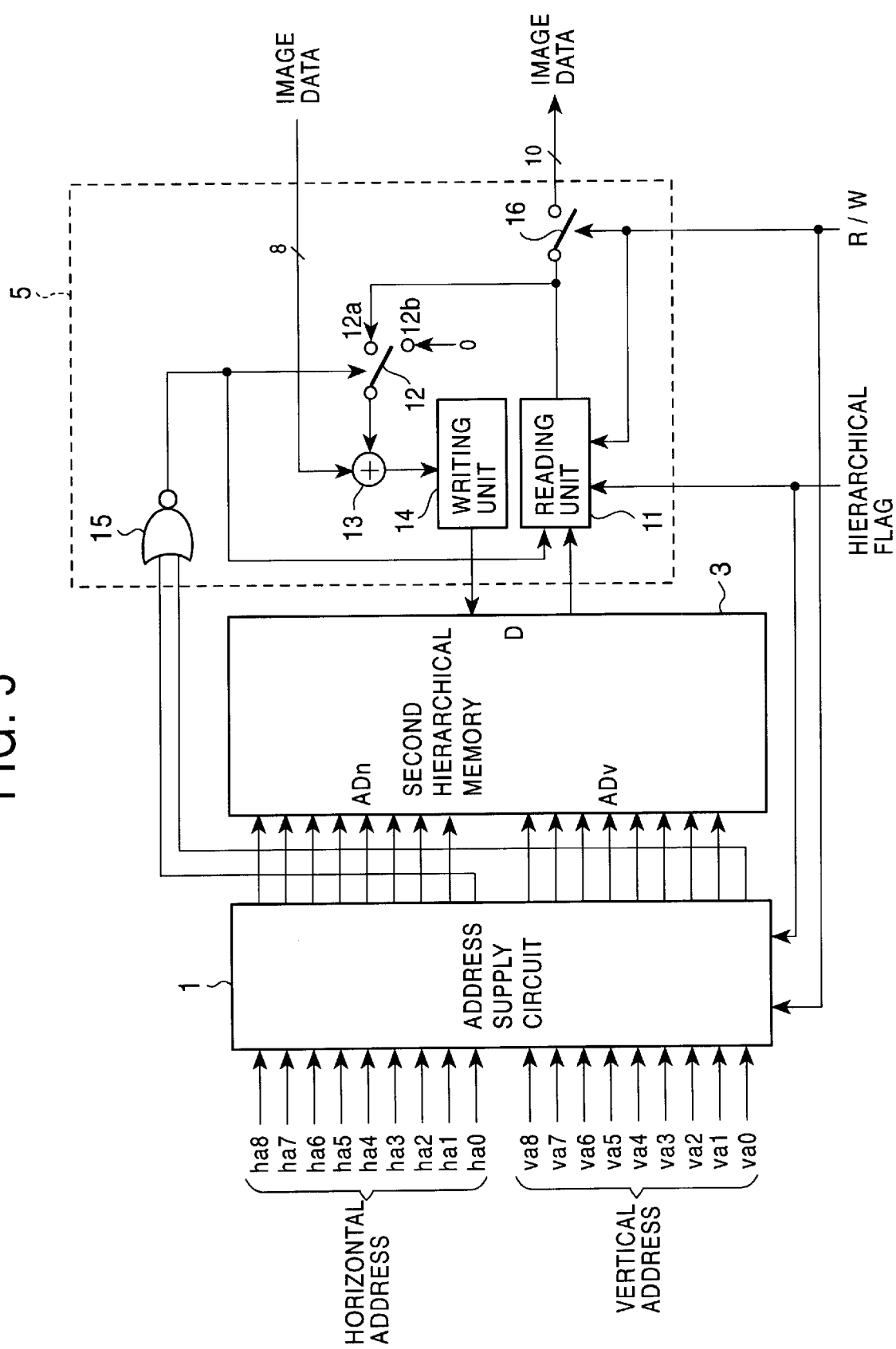
FIG. 5 is a block diagram showing a second functional example of the storage unit shown in FIG. 2.
Figure 6:
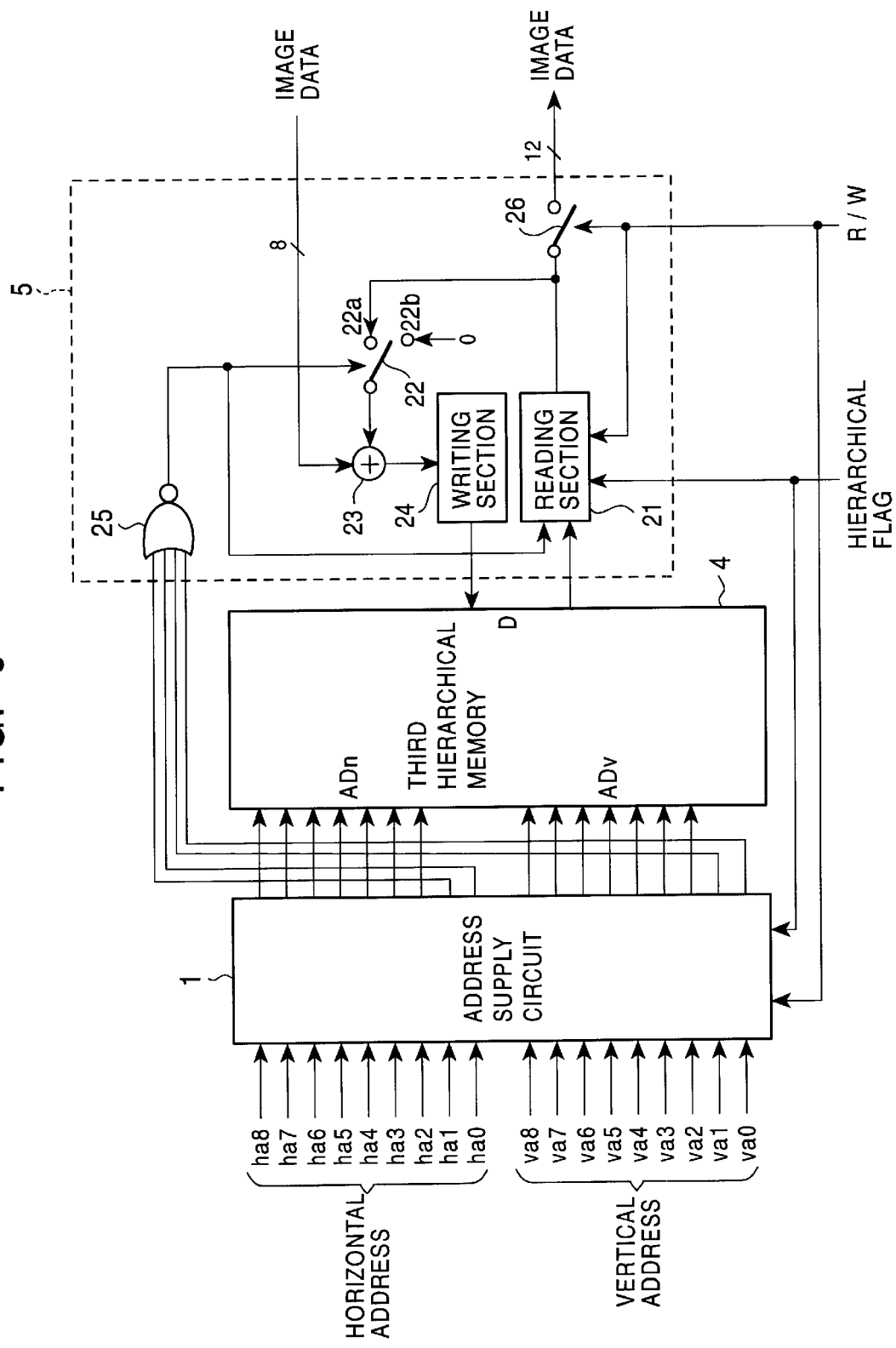
FIG. 6 is a block diagram showing a third functional example of the storage unit shown in FIG. 2.

When writing is performed, as shown in FIG. 5, the address supply circuit 1 supplies to the address terminals of the second hierarchical memory 3, for example, part of supplied horizontal addresses HA, namely, upper bits ha1 to ha8 excluding the least significant bit ha0, and part of vertical addresses VA, namely, upper bits va1 to va8 excluding the least significant bit va0. The address supply circuit 1 also outputs the least significant bit ha0 of the horizontal address HA and the least significant bit va0 of the vertical address VA as a control signal to the RMW circuit 5.

Accordingly, at a time in which four (2×2) first hierarchical pixels h(2s,2t), h(2s+1,2t), h(2s,2t+1), and h(2s+1,2t+1) as denoted by D1 in FIG. 3 are supplied to the RMW circuit 5, the address supply circuit 1 always outputs to the second hierarchical memory 3, a signal for designating an identical address (s,t) in the second hierarchical memory 3.

In the RMW circuit 5, the supplied first hierarchical SD image data is input to an arithmetic unit 13. In addition to the first hierarchical SD image data, the output of a switch 12 is supplied to the arithmetic unit 13, and the arithmetic unit 13 finds and outputs the sum of them to a writing unit 14.

The switch 12 is designed to select either a terminal 12*a* or 12*b* in accordance with the output of a NOR gate 15. The output of the reading unit 11 or zero is supplied to the terminal 12*a* or 12*b*. The least significant bit ha0 of the horizontal address HA and the least significant bit va0 of the vertical address VA are supplied from the address supply circuit 1 to the NOR gate 15. Accordingly, its output is set at level H in only a time where, among the 2×2 first hierarchical pixels h(2s,2t), h(2s+1,2t), h(2s,2t+1), and h(2s+1,2t+1), the top left pixel h(2s,2t) is supplied to the arithmetic unit 13, and is set at level L in other cases.

In the switch 12, the terminal 12*a* or 12*b* is selected when the output of the NOR gate 15 is at level L or level H.

The reading unit 11 reads data (stored data) stored at addresses corresponding to a signal output from the address supply circuit 1.

Accordingly, at a time in which, among the 2×2 first hierarchical pixels h(2s,2t), h(2s+1,2t), h(2s,2t+1), and h(2s+1,2t+1), the top left pixel h(2s,2t) is supplied to the arithmetic unit 13, the reading unit 11 reads the data stored at the address (s,t) in the second hierarchical memory 3, and supplies it to the terminal 12*a*. In this case, Both the least significant bit ha0 of the horizontal address HA and the least significant bit va0 of the vertical address VA are zero. Thus, the output of the NOR gate 15 is at level H, and the terminal 12*b* is selected in the switch 12.

As a result, zero is supplied to the arithmetic unit 13 via the switch 12.

The arithmetic unit 13 adds the zero and the first hierarchical pixel h(2s,2t), and supplies the sum (0+h(2s,2t)) to the writing unit 14. The writing unit 14 writes the output of the arithmetic unit 13 at the address corresponding to the signal output by the address supply circuit 1, namely, the address (s,t) in the second hierarchical memory 3.

Next, at a time in which, among the 2×2 first hierarchical pixels h(2s,2t), h(2s+1,2t), h(2s,2t+1), and h(2s+1,2t+1), the top left pixel h(2s,2t) is supplied to the arithmetic unit 13, the reading unit 11 reads data (0+h(2s,2t) here) stored at the address (s,t) in the second hierarchical memory 3, and supplies it to the terminal 12*a*.

In addition, in this case, the least significant bit ha0 of the horizontal address HA is one, and the least significant bit va0 of the vertical address VA is zero. Thus, the output of the NOR gate 15 is at level L, and the terminal 12*a* is selected in the switch 12.

As a result, the data (stored data)(0+h(2s,2t) here) read by the reading unit 11 are supplied to the arithmetic unit 13.

The arithmetic unit 13 adds the data supplied via the switch 13 and the first hierarchical pixel (0+h(2s,2t) +h(2s+1,2t)), and supplies the sum to the writing unit 14. The writing unit 14 writes the output of the arithmetic unit 13 at the address corresponding to the signal output by the address supply circuit 1, namely, the address (s,t) in the second hierarchical memory 3.

Subsequently, the supply of image data from the first hierarchical top to (2t+1)-th line is started. When, among the 2×2 first hierarchical pixels h(2s,2t), h(2s+1,2t), h(2s,2t+1), and h(2s+1,2t+1), the bottom left pixel h(2s,2t+1) is supplied to the arithmetic unit 13, the reading unit 11 similarly reads data (0+h(2s,2t)+h(2s+1,2t)) stored at the address (s,t) in the second hierarchical memory 3, and supplies it to the terminal 12a.

In this case, the least significant bit ha0 of the horizontal address HA is zero, and the least significant bit of the vertical address VA is one. Thus, the output of the NOR gate 15 is at level L, and the terminal 12a is selected in the switch 12.

As a result, the data (stored data) (0+h(2s,2t)+h(2s+1,2t)) read by the reading unit 11 are supplied to the arithmetic unit 13 via the switch 12.

The arithmetic unit 13 adds the data supplied via the switch 12 and the first hierarchical pixel h(2s,2t+1), and supplies the sum (0+h(2s,2t)+h(2s+1,2t)+h(2s,2t+1)) to the writing unit 14. The writing unit 14 writes the output of the arithmetic unit 13 at the address corresponding to the signal output by the address supply circuit 1, namely, the address (s,t) in the second hierarchical memory 3.

Next, when, among the 2×2 first hierarchical pixels h(2s, 2t), h(2s+1,2t), h(2s,2t+1) and h(2s+1,2t+1), the pixel h(2s+1,2t+1) on the right of the bottom left pixel h(2s,2t+1) is supplied to the arithmetic unit 13, the reading unit 11 reads data (0+h(2s,2t)+h(2s+1,2t)+h(2s,2t+1) here) stored at the address (s,t) in the second hierarchical memory 3, and supplies it to the terminal 12a.

In this case, both the least significant bit ha0 of the horizontal address HA and the least significant bit va0 of the vertical address VA are one. Thus, the output of the NOR gate 15 is at level L, and the terminal 12a is selected in the switch 12.

As a result, the data (stored data) (0+h(2s,2t)+h(2s+1,2t)+h(2s,2t+1)) read by the reading unit 11 via the switch 12 are supplied to the arithmetic unit 13.

The arithmetic unit 13 adds the data supplied via the switch 12 and the first hierarchical pixel h(2s,2t+1), and supplies the sum (0+h(2s,2t)+h(2s+1,2t)+h(2s,2t+1))) to the writing unit 14. The writing unit 14 writes the output of the arithmetic unit 13 at the address corresponding to the signal output by the address supply circuit 1, namely, the address (s,t) in the second hierarchical memory 3.

Therefore, at the address (s,t) in the second hierarchical memory 3, a sum expressed as the numerical expression h(2s,2t)+h(2s+1,2t)+h(2s,2t+1)+h(2s+1,2t+1namely, the second hierarchical pixel (pixel level) m(s,t) shown as the above-described equation (8) is finally stored.

In the above-described manner, in the second hierarchical memory 3, second hierarchical SD images, with one image composed of 256×256 pixels, are stored.

As described above, the first hierarchical SD image data are written at the address (HA,VA) of the first hierarchical memory 2 designated by the horizontal address HA and the vertical address VA, and from the address of the second hierarchical memory designated by parts of the horizontal address HA and the vertical address VA, ha1 to ha8 and va1 to va8, the stored data are read. Processing for adding the stored data and the first hierarchical SD image data is performed, and the sum is written at an address at which the stored data are stored. Thereby, while the first hierarchical SD image data are being stored, the second hierarchical SD image data can be generated and stored. In other words, the second SD image data can be obtained in real time.

Next, the reading of the second hierarchical SD image from the second hierarchical memory 3 will be described.

When reading is performed, if the hierarchical flag represents the second hierarchical level, the address supply circuit 1 similarly supplies the upper eight bits ha1 to ha8 or va1 to va8 of the supplied horizontal address HA or vertical address VA to the address terminals of the second hierarchical memory 2, and outputs the least significant bit ha0 or va0 as a control signal to the RMW circuit 5.

In addition, in the RMW circuit 5, the hierarchical flag, the R/W signal and the output of the NOR gate 15 are supplied to the reading unit 11. When the R/W signal represents reading, and the hierarchical flag represents the second hierarchical level, the reading unit 11 reads and outputs second hierarchical SD image data stored at an address corresponding to the signal output by the address supply circuit 1 while the output of the NOR gate 15 is at level H.

From the above descriptions, in the case where the set of the horizontal address HA and the vertical address VA is (2s,2t), (2s+1,2t), (2s,2t+1), or (2s+1,2t+1), in each case the same address (s,t) is output from the address supply circuit 1. Accordingly, the simple reading of data from an address of the second hierarchical memory 3 corresponding to the signal output by the address supply circuit 1 causes the reading of identical data four times.

Accordingly, only when the set of the horizontal address HA and the vertical address VA is, for example, (2s,2t) among (2s,2t), (2s+1,2t), (2s,2t+1), and (2s+1,2t+1), in other words, only when the output of the NOR gate 15 is at level H, the reading unit 11 reads second hierarchical pixel (pixel level) m(s,t) at address (s,t) of the second hierarchical memory 3.

The second hierarchical SD image data read by the reading unit 11 are supplied to the switch 16. The switch 16 is turned on only when the R/W signal represents reading, and is turned off in other cases. In the present case, since the switch 16 is turned on, the second hierarchical SD image data read by the reading unit 11 are output via the switch 16.

In the above manner, from the second hierarchical memory 3, one stored second hierarchical SD image composed of 256×256 pixels is read. Accordingly, in other words, a second hierarchical SD image which has been progressively scanned is output.

Next, access to the third hierarchical memory 4 will be described.

Initially, the address supply circuit 1 supplies part of supplied horizontal address HA, namely, upper seven bits ha2 to ha8 excluding lower two bits ha0 and ha1, and part of vertical address VA, namely, upper seven bits va2 to va8 excluding lower two bits va0 and va1, to the address terminals of the third hierarchical memory 4. The address supply circuit 1 also outputs upper two bits ha0 and ha1 of horizontal address HA and lower two bits va0 and va1 of vertical address VA as control signals to the RMW circuit 5.

Accordingly, at a time in which 16 (4×4) first al hierarchical pixels, for example, h(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), and h(4m+3,4n+3), as denoted by D2 in FIG. 3, are supplied to an RMW circuit 5, the address supply circuit 1 always outputs signals for designating identical address (m,n) of the third hierarchical memory 4.

In the RMW circuit 5, supplied first hierarchical SD image data are input to an arithmetic unit 23. In addition to the first hierarchical SD image data, the output of a switch 22 is supplied to the arithmetic unit 23. The arithmetic unit 23 adds them and supplies it to a writing unit 24.

In the switch 22, either terminal 22a or 22b is selected in accordance with the output of a NOR gate 25. The output of a reading unit 21 or zero is supplied to the terminal 22a or 22b. Lower two bits ha0 and ha1 of horizontal address HA and lower two bits va0 and va1 of vertical address VA are supplied from the address supply circuit 1 to the NOR gate 25. Accordingly, its output is at level H at only a time where, among 4×4 first hierarchical pixels h(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+3), h(4m+1,4n+3), h(4m+2,4n+1), h(4m+3,4n+1), h(4m,4n+3), h(4m+1,4n+3), h(4m+2,4n+3), and h(4m+3,4n+3), the top leftest pixel h(4m, 4n) is supplied to the arithmetic unit 23, while it is at level L in other cases.

The switch 22 is designed so that the terminal 22a or 22b is selected when the output of the NOR gate 25 is at level L or H.

The reading unit 21 is designed so as to read data stored (stored data) at an address corresponding to the signals output by the address supply circuit 1. Accordingly, at a time in which first hierarchical pixel h(4m,4n) is supplied to the arithmetic unit 23, the reading unit 21 reads data stored at address (m,n) of the third hierarchical memory 4, and supplies it to the terminal 22a. In this case, lower two bits ha0 and ha1 of horizontal address HA and lower two bits va0 and va1 of vertical address VA are all zero. Thus, the output of the NOR gate 25 is at level H, and the terminal 22b is selected in the switch 22.

As a result, zero is supplied to the arithmetic unit 23 via the switch 22.

The arithmetic unit 23 adds the zero and first hierarchical pixel h(4m,4n), and supplies the sum (0+h(4m,4n)) to the writing unit 24. The writing unit 24 writes the output of the arithmetic unit 23 at an address corresponding to the signals output by the address supply circuit 1, namely, address (m,n) of the third hierarchical memory 4.

Next, at a time in which pixel h(4m+1,4n) on the adjacent right of first hierarchical pixel h(4m,4n) is supplied to the arithmetic unit 23, the reading unit 21 reads data (0+h(4m, 4n) here) stored at address (m,n) of the third hierarchical memory 4, and supplies it to the terminal 22a.

In addition, in this case, both lower two bits ha0 and ha1 of horizontal address HA are one or zero, and both lower two bits va0 and va1 of vertical address VA are zero. Thus, the output of the NOR gate 25 is at level L, and the terminal 22a is selected in the switch 22.

As a result, the data (store data)(0+h(4m,4n), here) read by the reading unit 21 are supplied to the arithmetic unit 23 via the switch 22.

The arithmetic unit 23 adds the data supplied via the switch 22 and first hierarchical pixel h(4m+1,4n), and supplies the sum (0+h(4m,4n)+h(4m+1,4n)) to the writing unit 24. The writing unit 24 writes the output of the arithmetic unit 23 at an address corresponding to the signals output by the address supply circuit 1, namely, address (m,n) of the third hierarchical memory 4.

Next, at a time in which pixel h(4m+2,4n) on the adjacent right of first hierarchical pixel h(4m+1,4n) is supplied to the arithmetic unit 23, the reading unit 21 similarly reads data (0+h(4m,4n)+h(4m+1,4n)) stored at address (m,n) of the third hierarchical memory 4, and supplies it to the terminal 22a.

In this case, each of lower two bits ha0 or ha1 of horizontal address HA is one or zero, and both lower two bits va0 and va1 of vertical address VA are zero. Thus, the output of the NOR gate 25 is at level L, and the terminal 22a is selected in the switch 22.

As a result, the data (stored data)(0+h(4m,4n)+h(4m+1, 4n) here) read by the reading unit 21 are supplied to the arithmetic unit 23 via the switch 22.

The arithmetic unit 23 adds the data supplied via the switch 22 and first hierarchical pixel h(4m+2,4n), and supplies the sum (0+h(4m,4n)+h(4m+1,4n)+h(4m+2,4n)) to the writing unit 24. The writing unit 24 writes the output of the arithmetic unit 23 at an address corresponding to the signals output by the address supply circuit 1, namely, address (m,n) of the third hierarchical memory 4.

Subsequently, at a time in which first hierarchical pixels h(4m+3,4n), h(4m,4n+1), h(4m+1,4n+1), h(4m+2,4n+1), h(4m+3,4n+1), h(4m,4n+2), h(4m+1,4n+2), h(4m+2,4n+1), h(4m+3,4n+2), h(4m,4n+3), h(4m+1,4n+3), h(4m+2,4n+3), and h(4m+3,4n+3) are supplied to the arithmetic unit 23, processing similar to the above-described cases is performed in any case, whereby, at address (m,n) of the third hierarchical memory 4, third hierarchical pixels (pixel levels) q(m,n) represented by equation (9) is finally stored.

In the foregoing manner, third hierarchical SD images in which one image consists of 128×128 pixels are stored in the third hierarchical memory 4.

Therefore, at the same time as the first hierarchical SD image data are stored, the second hierarchical SD image data and the third hierarchical SD image data can be generated and stored. In other words, the second and third hierarchical SD image data can be obtained.

Next, the reading of a third hierarchical SD image from the third hierarchical memory 4 will be described.

When the reading is performed, if the hierarchical flag represents the third hierarchical level, the address supply circuit 1 supplies upper seven bits ha2 to ha8 or va2 to va8 of supplied horizontal address HA or vertical address VA to the address terminals of the third hierarchical memory 4, and also outputs lower two bits ha1 and ha1 or va0 and va1 of each as control signals to the RMW circuit 5.

In the RMW circuit 5, the hierarchical flag, the R/W signal and the output of the NOR gate 25 are supplied to the reading unit 21. In the case where the R/W signal represents reading, and the hierarchical flag represents the third hierarchical level, the reading unit 21 reads and outputs third hierarchical SD image data stored at an address corresponding to the signals output by the address supply circuit while the output of the NOR gate 25 is being at level H.

From the above description, in cases where the set of horizontal address HA and vertical address VA is h(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), and h(4m+3,4n+3), in any case, identical address (m,n) is output from the address supply circuit 1. Thus, the simple reading of data at an address of the third hierarchical memory 4 corresponding to the signals output by the address supply circuit 1 causes the reading of identical data 16 times.

Accordingly, among the cases, in the case where the set of horizontal address HA and vertical address VA is, for example, (4m,4n), in other words, only when the output of the NOR gate 25 is at level H, the reading unit 21 reads third hierarchical pixel (pixel level) m(m,n) at address (m,n) of the third hierarchical memory 4.

The third hierarchical SD image data read by the reading unit 21 are supplied to the switch 26. The switch 26 is turned on only when the R/W signal represents reading, and is turned off in other cases. In the present case, since the switch 26 is turned on, the third hierarchical SD image data read by the reading unit 21 are output via the switch 26.

In the above-described manner, from the third hierarchical memory 4, one 128×128 pixel third hierarchical SD image stored is read. In other words, thereby, a third hierarchical SD image which has been progressively scanned is output.

The reading of second hierarchical SD image data from the second hierarchical memory 3 can be performed by not only the above-described manner but also giving lower eight bits ha0 to ha7 of horizontal address HA and lower eight bits va0 to va7 of vertical address VA as an address of the second hierarchical memory 3 from the address supply circuit 1. Similarly, also the reading of third hierarchical SD image data from the third hierarchical memory 4 can be performed by giving lower seven bits ha0 to ha6 of horizontal address HA and lower seven bits va0 to va6 of vertical address VA as an address of the third hierarchical memory 4 from the third hierarchical memory 4.

In the first hierarchical memory 101, the second hierarchical memory 102, or the third hierarchical memory fan 103, in FIG. 1, the first to third hierarchical SD images, stored in the first hierarchical memory 2, the second hierarchical memory 3 or the third hierarchical memory 4, in FIG. 2, are stored in the above-described manner. Accordingly, the first hierarchical memory 101, the second hierarchical memory 102, or the third hierarchical memory 103, in FIG. 1, has a structure identical to the first hierarchical memory 2, the second hierarchical memory 3 or the third hierarchical memory 4, in FIG. 2.

Figure 7:
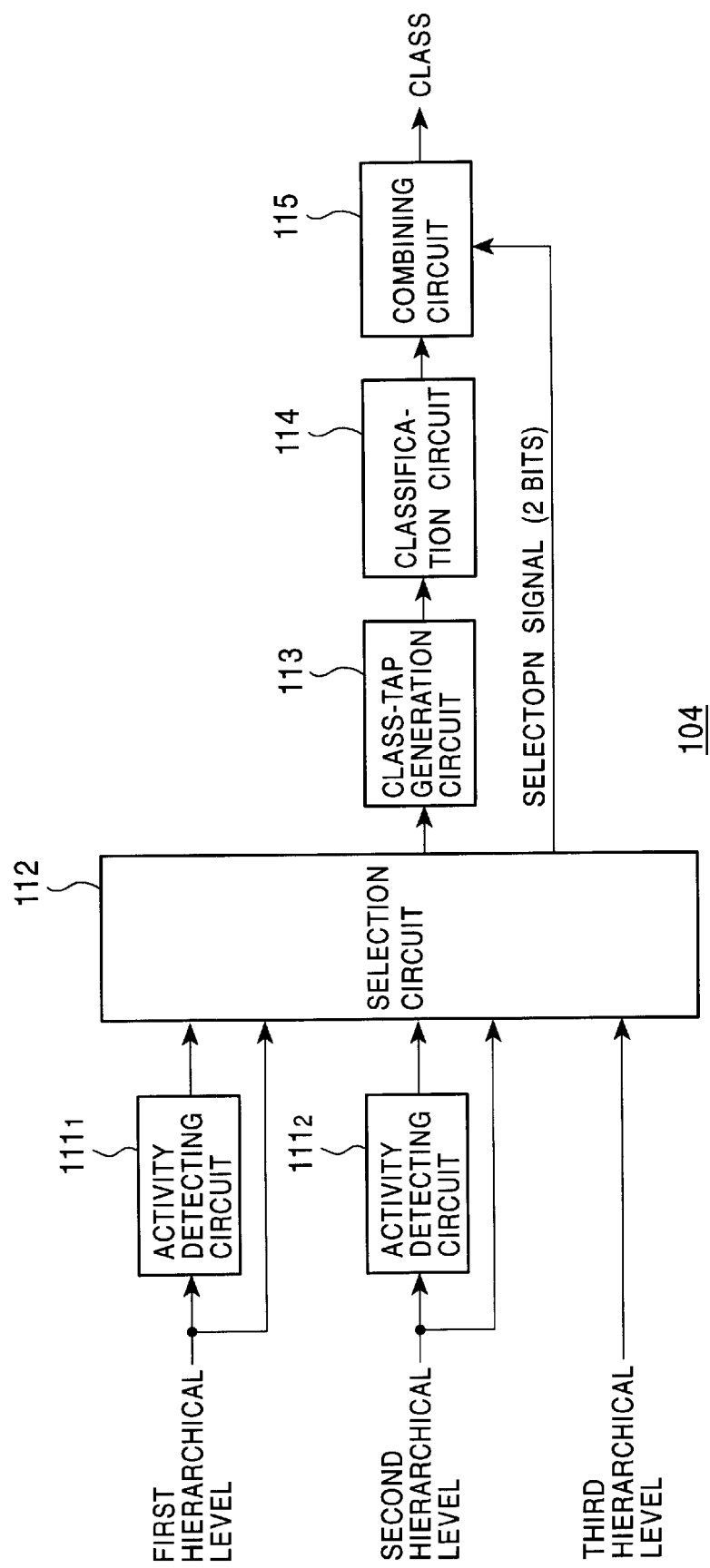
FIG. 7 is a block diagram showing each first structure of the hierarchical classification circuits 104a to 104d.

Next, FIG. 7 shows a block diagram of the multihierarchical classification unit 104 (each of multihierarchical classification circuits 104a to 104d).

The first to third hierarchical SD images, stored in the first hierarchical memory 101, the second hierarchical memory 102, or the third hierarchical memory 103, are supplied to a selection circuit 112. In addition, the first or second hierarchical SD image is supplied to also an activity selection circuit $111_1$ or $111_2$.

The activity selection circuit $111_1$ or $111_2$ uses, for example, SD pixels close to a reference pixel in a first or second hierarchical SD image to detect their activity, and supplies the detected result to the selection circuit 112. The selection circuit 112 selects any one of the first to third hierarchical SD images, based on the activities from the activity detection circuits $111_1$ and $111_2$, and supplies it to the class-tap generating circuit 113. The selection circuit 112 outputs to a combining circuit 115, for example, a 2-bit selection signal representing the selected one of the first to third hierarchical levels. The class-tap generating circuit 113 uses the image from the selection circuit 112 to generate a class tap for classifying reference pixels, and supplies it to a classification circuit 114. The classification circuit 114 uses the class tap from the class-tap generating circuit 113 to perform classification, and supplies the classified result to the combining circuit 115. The combining circuit 115 combines the selection signal from the selection circuit 112 and a class as the classified result from the classification circuit 114 to form one value, and supplies it as a final classification result on a reference pixel to the adaptive processing unit 105 (FIG. 1).

Next, the operation will be described.

Initially, in the activity detection circuit $111_1$ or $111_2$, each activity around the reference pixel in the first or second hierarchical SD image is detected.

In other words, the activity detection circuit $111_1$ detects, for example, activity in a 3×3 pixel area having a pixel positioned identically to one reference pixel, among pixels constituting the first hierarchical SD image. The activity detection circuit $111_2$ also detects, for example, activity in a 3×3 pixel area having a pixel positioned identically to one reference pixel, among pixels constituting the second hierarchical SD image.

Here, the second hierarchical SD image has half the number of horizontal and vertical pixels as the first hierarchical SD image. Thus, in reference to the first hierarchical SD image, the activity detection circuit $111_2$ detects activity in a broader area than the activity detection circuit $111_1$.

Figure 13:
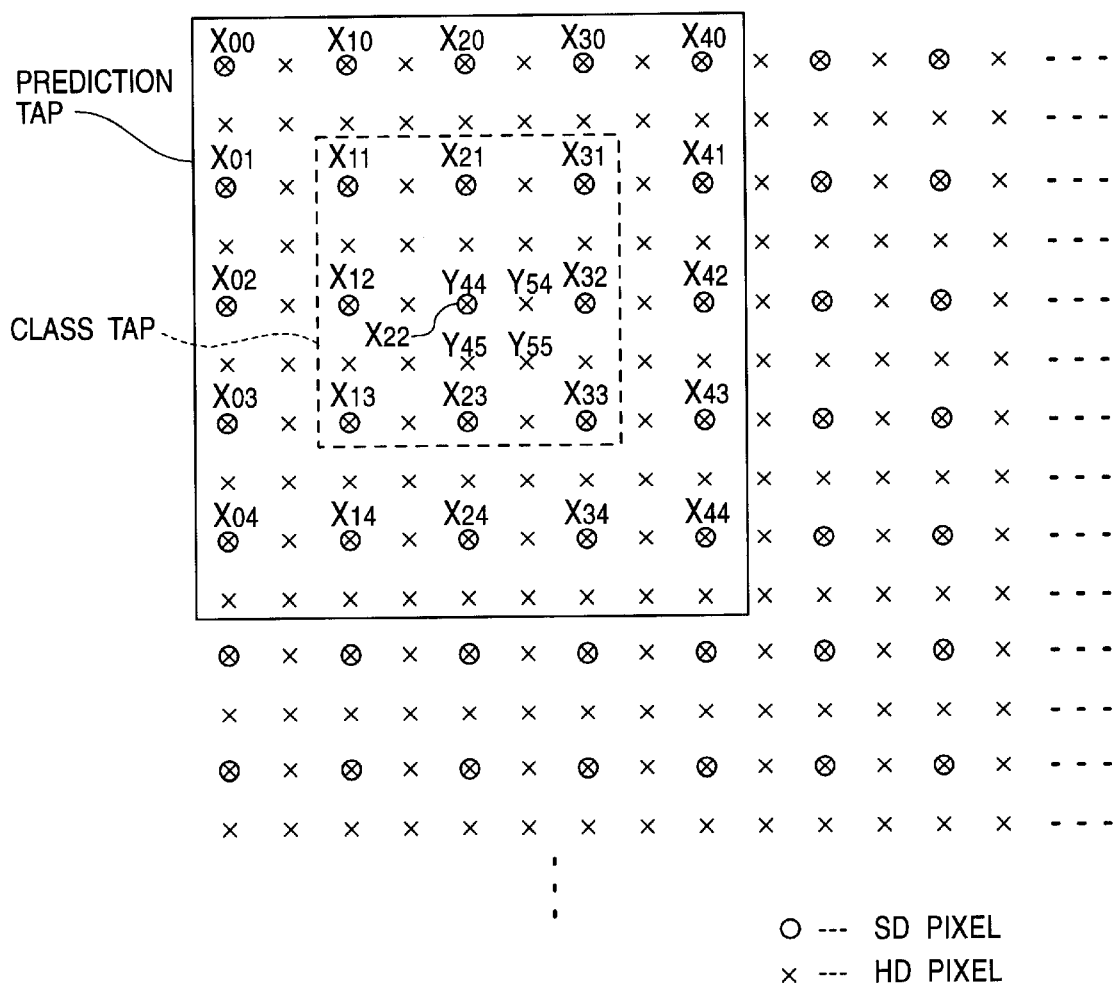
FIG. 13 is a drawing illustrating the formation of a class tap and a prediction tap.
Figure 14:
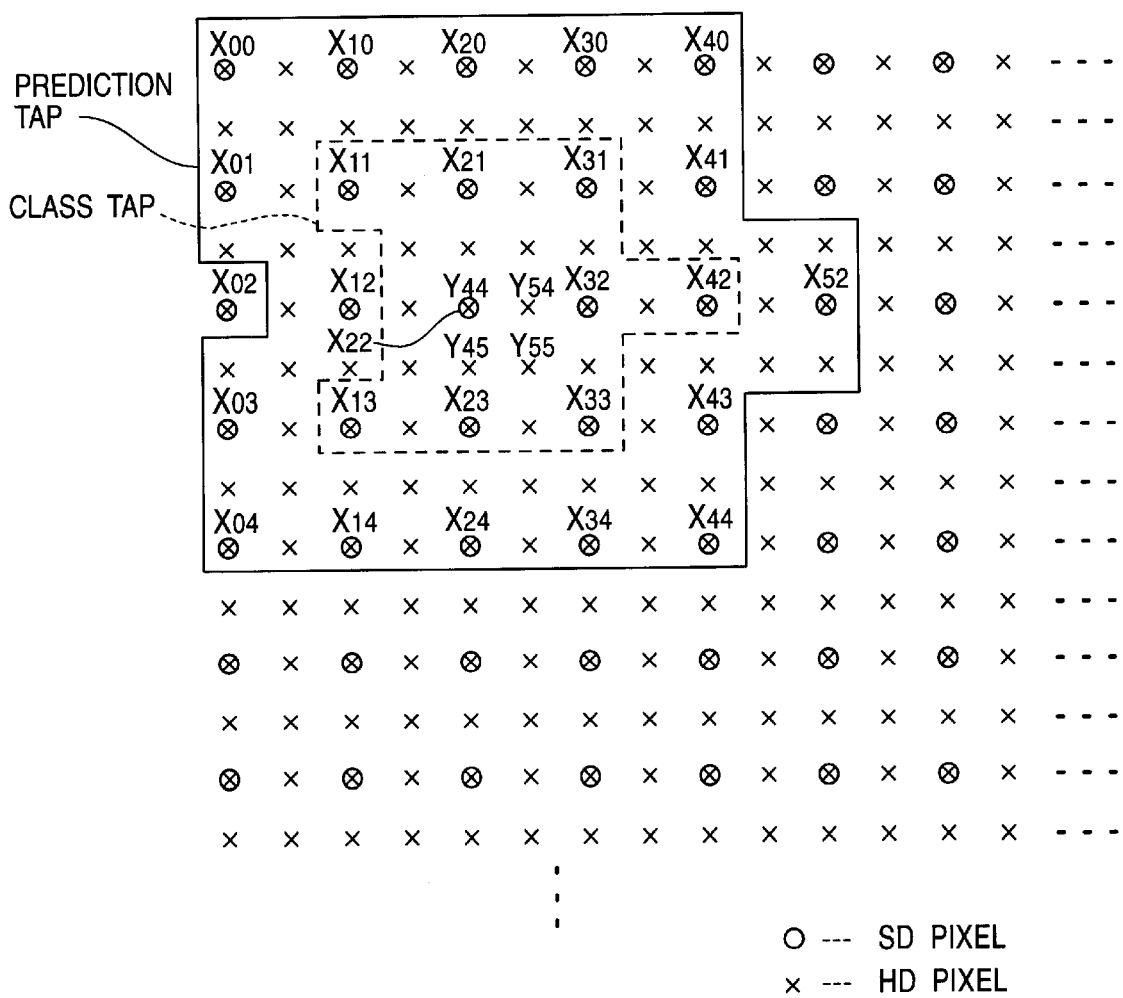
FIG. 14 is a drawing illustrating the formation of a class tap and a prediction tap.
Figure 15:
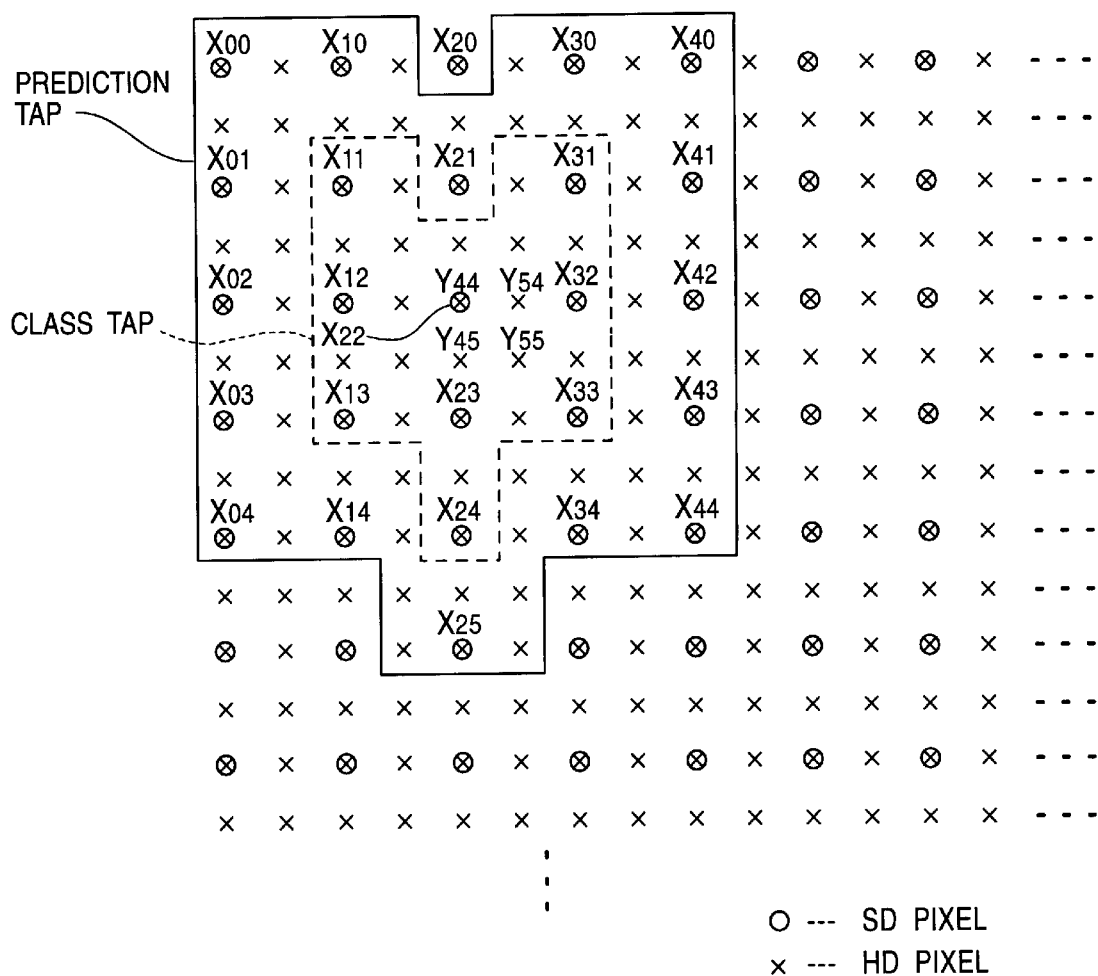
FIG. 15 is a drawing illustrating the formation of a class tap and a prediction tap.
Figure 16:
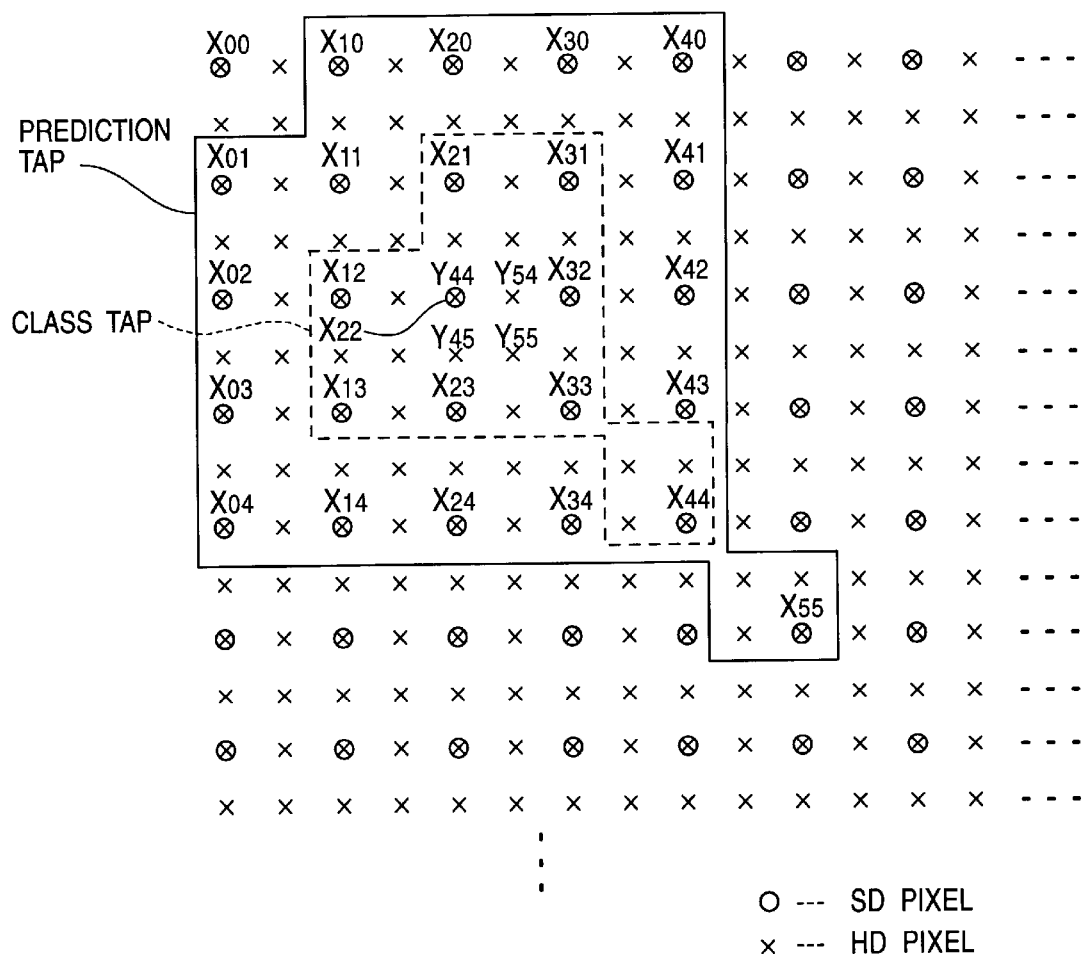
FIG. 16 is a drawing illustrating the formation of a class tap and a prediction tap.

The detection of activity in the 3×3 pixel area having the first and second hierarchical SD pixels positioned identically to the reference pixel, namely, a square area corresponding to the class tap described using FIG. 13, as described above, is performed in, e.g., the multihierarchical classification circuit 104a, and in the other multihierarchical classification circuits 104b to 104d, activities in areas corresponding to the class taps described with FIG. 14 to FIG. 16 are detected.

The activity as to the first or second image, detected by the activity detection circuit $111_1$ or $111_2$ is supplied to the selection circuit 112. In the selection circuit 112, any one of the first to third hierarchical SD images is selected, based on the activity from the activity detection circuits $111_1$ or $111_2$.

In other words, the selection circuit 112 determines whether or not the activity on the first hierarchical image is greater than predetermined threshold value $\epsilon$. If the activity on the first hierarchical image is greater than predetermined threshold value $\epsilon$, the selection circuit 112 selects and supplies the first hierarchical image to the class-tap generating circuit 113.

If the activity on the first hierarchical image is not greater than predetermined threshold value $\epsilon$, the selection circuit 112 determines whether or not the activity on the second hierarchical image is greater than predetermined threshold value $\epsilon$. If the activity on the second hierarchical image is greater than predetermined threshold value $\epsilon$, the selection circuit 112 selects and supplies the second hierarchical image to the class-tap generating circuit 113.

If the activity on the second hierarchical image is not greater than predetermined threshold value $\epsilon$, the selection circuit 112 selects and supplies the third hierarchical image to the class-tap generating circuit 113.

The selection circuit 112 also supplies a selection signal representing the selected hierarchical level to the combining circuit 115.

The class-tap generating circuit 113 uses the hierarchical image supplied from the selection circuit 112 to generate (form) a class tap.

Figure 8:
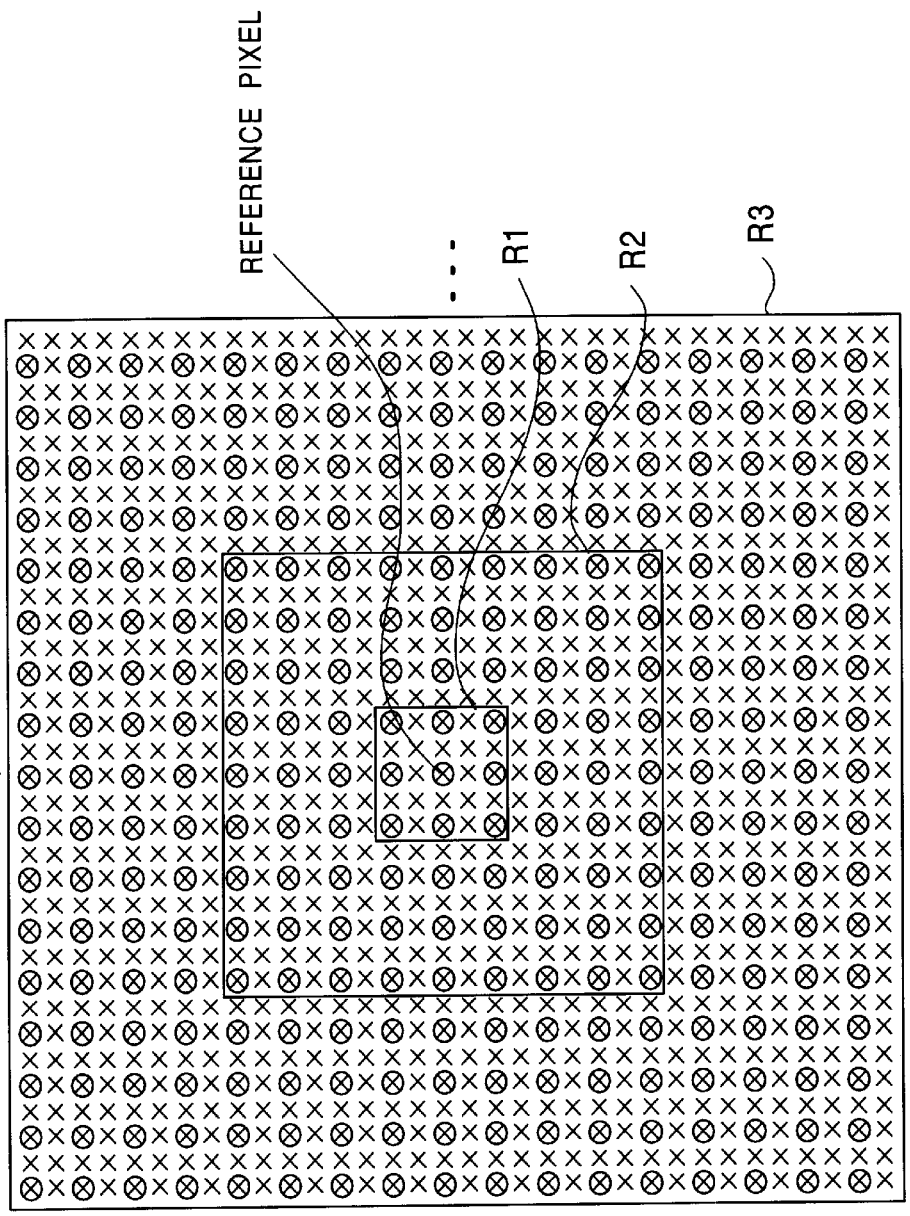
FIG. 8 is a drawing illustrating a class tap generated by the class-tap generating circuit 113 in FIG. 7.

In other words, in the case where the first hierarchical SD image is selected by the selection circuit 112, namely, in the case where, among SD pixels included in the first hierarchical SD image, denoted by R1 in FIG. 8, an activity in a 3×3 pixel area having as the center an SD pixel positioned identically to one reference pixel is greater than threshold value $\epsilon$, the class-tap generating circuit 113 treats the 3×3 first hierarchical SD pixels as a class tap, and supplies it to the classification circuit 114. In FIG. 8, symbols ○ represent first hierarchical SD pixels, and × represent HD pixels.

In the case where the second hierarchical SD image is selected by the selection circuit 112, namely, when it is assumed that the first hierarchical SD image is used as a reference, in the case where, among SD pixels included in the second hierarchical SD image (image having half the number of horizontal and vertical pixels as the first hierarchical SD image), denoted by R2 in FIG. 8, an activity in a 3×3 pixel area having as the center an SD pixel positioned identically to the reference pixel is greater than threshold value $\epsilon$, the class-tap generating circuit 113 treats the 3×3 first hierarchical SD pixels as a class tap, and supplies it to the classification circuit 114. Therefore, in this case, with the first hierarchical SD image used as a reference, a class tap is formed from nine second hierarchical SD pixels in an area which is horizontally and vertically four times the area in the case where the first hierarchical SD image is selected.

In the case where the third hierarchical SD image is selected by the selection circuit 112, when it is assumed that the first hierarchical SD image is used as a reference, among SD pixels included in the third hierarchical SD image (image having quarter the number of horizontal and vertical pixels as the first hierarchical SD image), denoted by R3 in FIG. 8, 3×3 pixels having as the center an SD pixel positioned identically to the reference pixel are treated as a class tap and supplied to the classification circuit 114 by the class-tap generating circuit 113. Therefore, in this case, when it is assumed that the first hierarchical SD image is used as a reference, a class tap is formed from nine third hierarchical SD pixels in an area which is horizontally and vertically 16 times the area in the case where the first hierarchical SD image is selected.

The above-described class-tap formation in the 3×3 pixel areas having first to third SD pixels positioned identically to the reference pixel, namely, in the SD pixels having the positional relationship described with FIG. 13, is performed in, for example, the multihierarchical classification circuit 104a, and in the other multihierarchical classification circuits 104b to 104d, class taps based on pixels having the positional relationships described with FIG. 14 to FIG. 16 are respectively formed.

Figure 12:
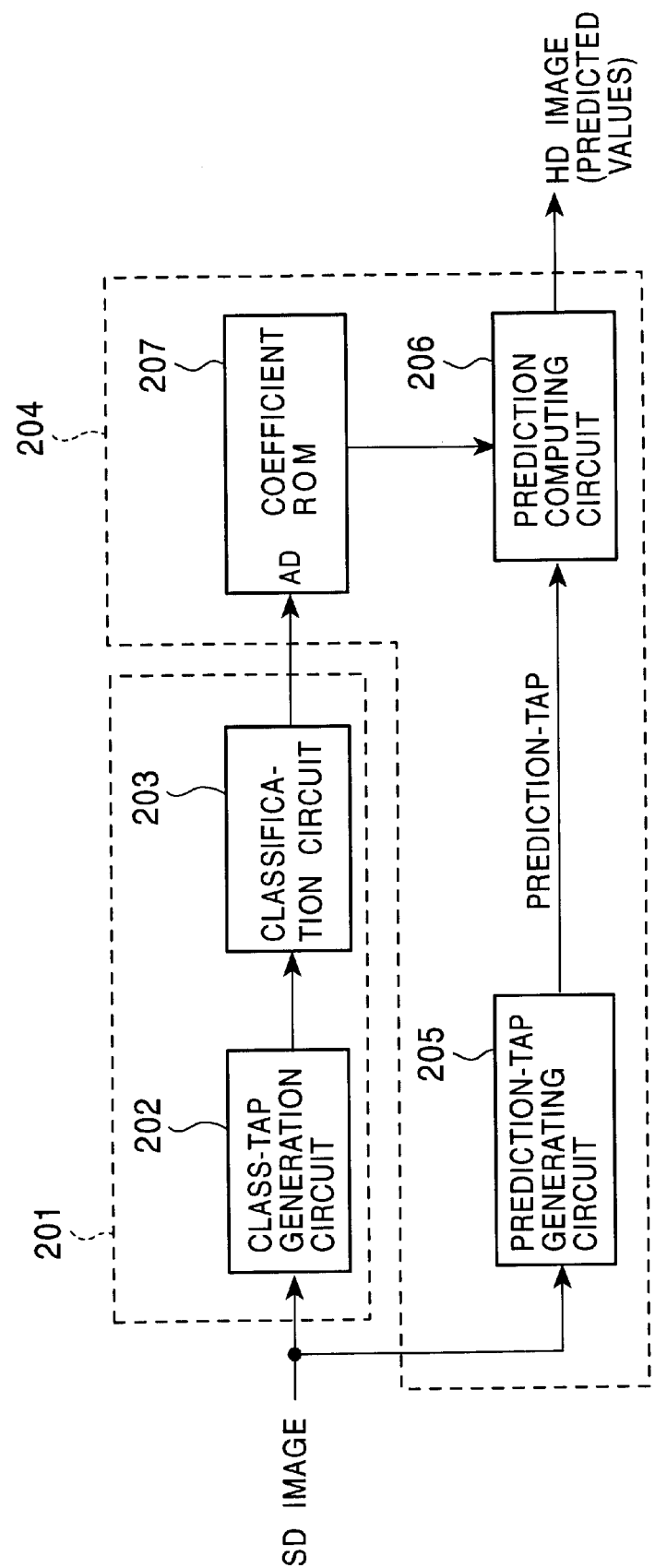
FIG. 12 is a block diagram showing one example of a conventional image converter.

Similarly to the case in the classification circuit 203 in FIG. 12, the classification circuit 114 uses the class tap from the class-tap generating circuit 113 to classify the reference pixels. The classified results are supplied to the combining circuit 115. The combining circuit 115 adds as upper bits the selection signal from the selection circuit 112 to a value as the classified result from the classification circuit 114, and supplies to the adaptive processing unit 5, the sum as a final class (value representing a class) based on the reference pixel.

As described above, with the first hierarchical SD image used as a reference, images at hierarchical levels corresponding to areas in which activity has certain magnitude (threshold value $\epsilon$, here) is used to form class taps for classifying reference pixels, whereby classes adapted for the reference pixels can be obtained by using the class taps to perform classification.

As described above, the activities of the first and second hierarchical images are detected. However, in addition to them, detection of the activities of the second and third hierarchical images can be performed. In this case, when, the third hierarchical activity is smaller than, for example, predetermined threshold value $\epsilon$, class taps may be formed using the third hierarchical image. In the case where the third hierarchical activity is equal to predetermined threshold value $\epsilon'$ or greater and the second hierarchical activity is less than predetermined threshold value $\epsilon$, class taps may be formed using the second hierarchical image. In addition, in the case where the second hierarchical activity is equal to predetermined $\epsilon'$ or greater, class taps may be formed using the first hierarchical image.

Figure 9:
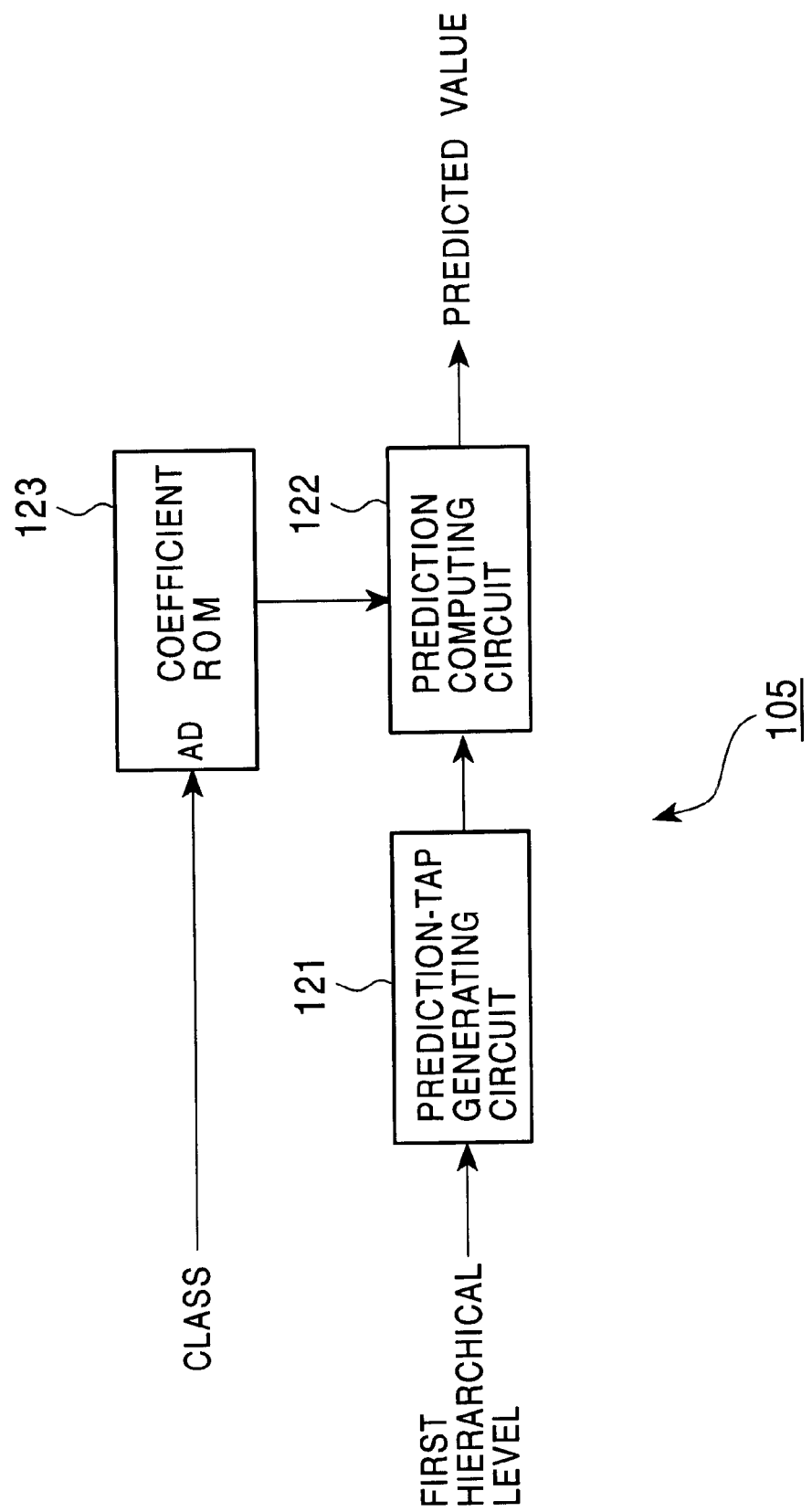
FIG. 9 is a block diagram showing each structure of the adaptive processing circuits 105a to 105d in FIG. 1.

Next, FIG. 9 shows a block diagram of the adaptive processing unit 105 (each of adaptive processing circuits 105a to 105d ) in FIG. 1:

A prediction-tap generating circuit 121, a prediction arithmetic circuit 122, or a coefficient ROM 123 is similar in structure to the prediction-tap generating circuit 205, the prediction arithmetic unit 206, or the coefficient ROM 207, in FIG. 12.

From the first hierarchical SD image supplied from the first hierarchical memory 101 (FIG. 1), a plurality of SD pixels having a predetermined positional relationship with respect to one reference pixel, which are used in the prediction arithmetic circuit 122 to find a predicted value based on the one reference pixel, are extracted and supplied as a prediction tap to the prediction arithmetic circuit 122 by the prediction-tap generating circuit 121.

Specifically, here, for example, prediction taps as described with FIG. 13 to FIG. 16 are formed (in each prediction-tap generating circuit 121 of the adaptive processing circuits 105a to 105d) and supplied to the prediction arithmetic circuit 122.

In addition, not only the prediction tap from the prediction-tap generating circuit 121 but also a set of prediction coefficients from the coefficient ROM 123 are supplied to the prediction arithmetic circuit 122.

The coefficient ROM 123 holds for classes, the sets of prediction coefficients found by predetermined learning, and its address terminal (AD) is supplied with a reference pixel class from the multihierarchical classification unit 104 (FIG. 1). On being supplied with classes from the multihierarchical classification unit 104, the coefficient ROM 123 reads prediction coefficients stored at addresses corresponding to the classes, and supplies them to the prediction arithmetic circuit 122.

In this manner, the prediction taps corresponding to the reference pixels and the prediction coefficients on the reference pixel classes are supplied to the prediction arithmetic circuit 122. The prediction arithmetic circuit 122 uses prediction coefficients $w, w_2, \ldots$ from the coefficient ROM 123 and (SD pixels constituting) prediction taps $x1, x2, \ldots$ from the prediction-tap generating circuit to carry out operations shown by equation (1), whereby finding predicted values E[y] based on reference pixels (HD pixels), and outputs them as pixel levels on HD pixels.

As described above, from the multihierarchical classification unit 104, classes more suitable for reference pixels are supplied. Accordingly, by performing the foregoing adaptive processing in accordance with the classes, image quality on the resultant HD image can be improved.

Figure 10:
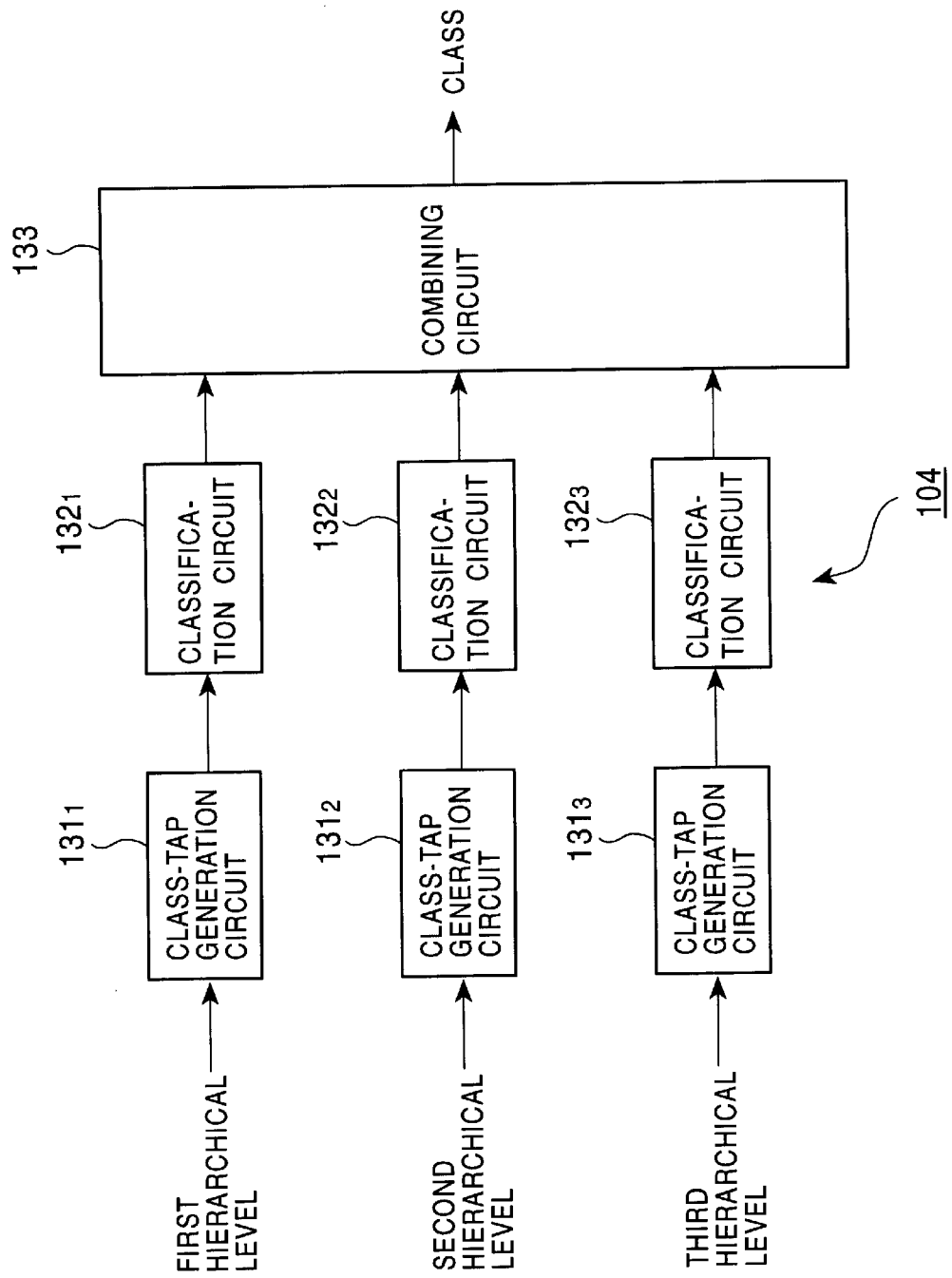
FIG. 10 is a block diagram showing each second structure of the hierarchical classification circuits 104a to 104d in FIG. 1.

Next, FIG. 10 shows another block diagram of the multihierarchical classification unit 104 (each of the multihierarchical classification circuits 104a to 104d) in FIG. 1.

The first to third hierarchical image data stored in the first hierarchical memory 101, the second hierarchical memory 102, or the third hierarchical memory 103, are each supplied to class-tap generating circuits $131_1$ to $131_3$.

Similarly to, for example, the case in the class-tap generating circuit 113 in FIG. 7, the class-tap generating circuits $131_1$ to $131_3$ use the first to third hierarchical images to generate (form) class taps for classifying reference pixels, and respectively supply them to classification circuits $132_1$ to $132_3$. Similarly to, for example, the case in the classification circuit 114 in FIG. 7, the classification circuits $132_1$ to $132_3$ use the class taps from the class-tap generating circuits $131_1$ to $131_3$ to classify the reference pixels, and supply each of them to a combining circuit 133. The combining circuit 133 combines the respective classes from the classification circuits $132_1$ to $132_3$, and supplies the combination result as a final class for the reference pixels to the adaptive processing unit 105 (FIG. 1).

In the multihierarchical classification unit 104 (each of the multihierarchical classification circuits 104a to 104d), the class-tap generating circuits $131_1$ to $131_3$ use the first to third hierarchical images to form the class taps, respectively.

Specifically, when, for example, the first to third hierarchical images are selected in the selection circuit 112, the class-tap generating circuits $131_1$ to $131_3$ respectively form class taps similar to the class taps formed by the class-tap generating circuit 113 in the same figure, using the first to third hierarchical images. The class taps formed using the first to third hierarchical images are respectively supplied to the classification circuits $132_1$ to $132_3$.

The classification circuits $132_1$ to $132_3$ use the class taps from the class-tap generating circuits $131_1$ to $131_3$ to perform classification, and supply to the combining circuit 133, the three resultant classes based on the reference pixel (classification results having used class taps formed from each of the first to third images).

The combining circuit 133 combines the classes from the classification circuits $132_1$ to $132_3$ to form one class. In other words, the combining circuit 133 uses values representing classes from classification circuits $132_1$ to $132_3$ as upper bits, intermediate bits and lower bits to form one bit string. The value is supplied as a final class based on the reference pixel to the adaptive processing unit 105.

As described above, the first to third hierarchical SD images are used to perform classification, and the classification results are combined to form a final classification result based on the reference pixel, in other words, classification is performed equivalently using not only SD pixels around a reference pixel but also SD pixels at a distance from the reference pixel, so that the reference pixel can be classified into a class adapted for the reference pixel. In addition, by performing adaptive processing so as to correspond to the class, the image quality of the resultant HD image can be improved.

In FIG. 8, by also using, for example, all the SD pixels in the area denoted by R3 to perform classification, it is expected that effects similar to the above-described case are obtained. In this case, the number of the first hierarchical SD pixels in the area R3 is large, which excessively increases the processing load.

In other words, for example, in the embodiment in FIG. 7, a class tap formed by the class-tap generating circuit 113 consists of nine SD pixels, similarly to the case in the class-tap generating circuit 202 in FIG. 12, and a 2-bit selection signal is added to a classification result having used the class tap. Thus, simply, classification into one of a number of classes in proportion to $2^{11}(=2^9 \times 2^2)$ is performed.

In addition, in the embodiment in FIG. 10, the class-tap generating circuits $131_1$ to $131_3$ respectively form three class taps each composed of nine SD pixels, similar to the case in the class-tap generating circuit 202 in FIG. 12, and after the class taps are used to perform classification, the three classification results are combined. Thus, simply, classification into one of a number of classes in proportion to $2^{27}(=2^9 \times 2^9 \times 2^9)$ is performed.

Conversely, the area R3 in FIG. 8 includes $289(=17 \times 17)$ first hierarchical SD pixels. Thus, in the case where class taps are formed using them, classification into one of a number of classes in proportion to an extremely large number, $2^{289}$, needs to be performed. Accordingly, in this case the processing load is extremely large.

Figure 11:
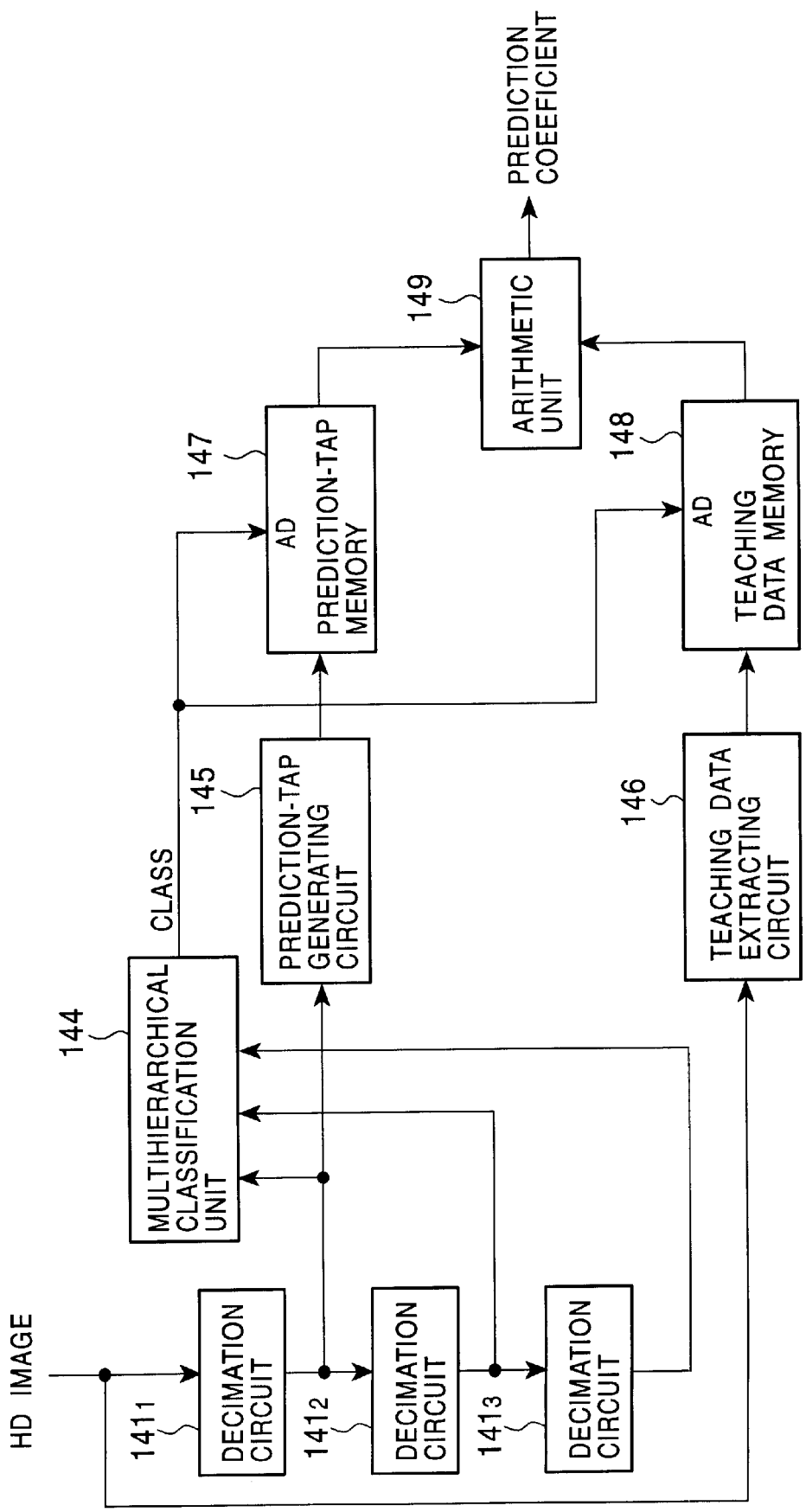
FIG. 11 is a block diagram showing one embodiment of a learning apparatus for performing learning concerning prediction coefficients to be stored in the coefficient ROM 123 in FIG. 9.
Figure 17:
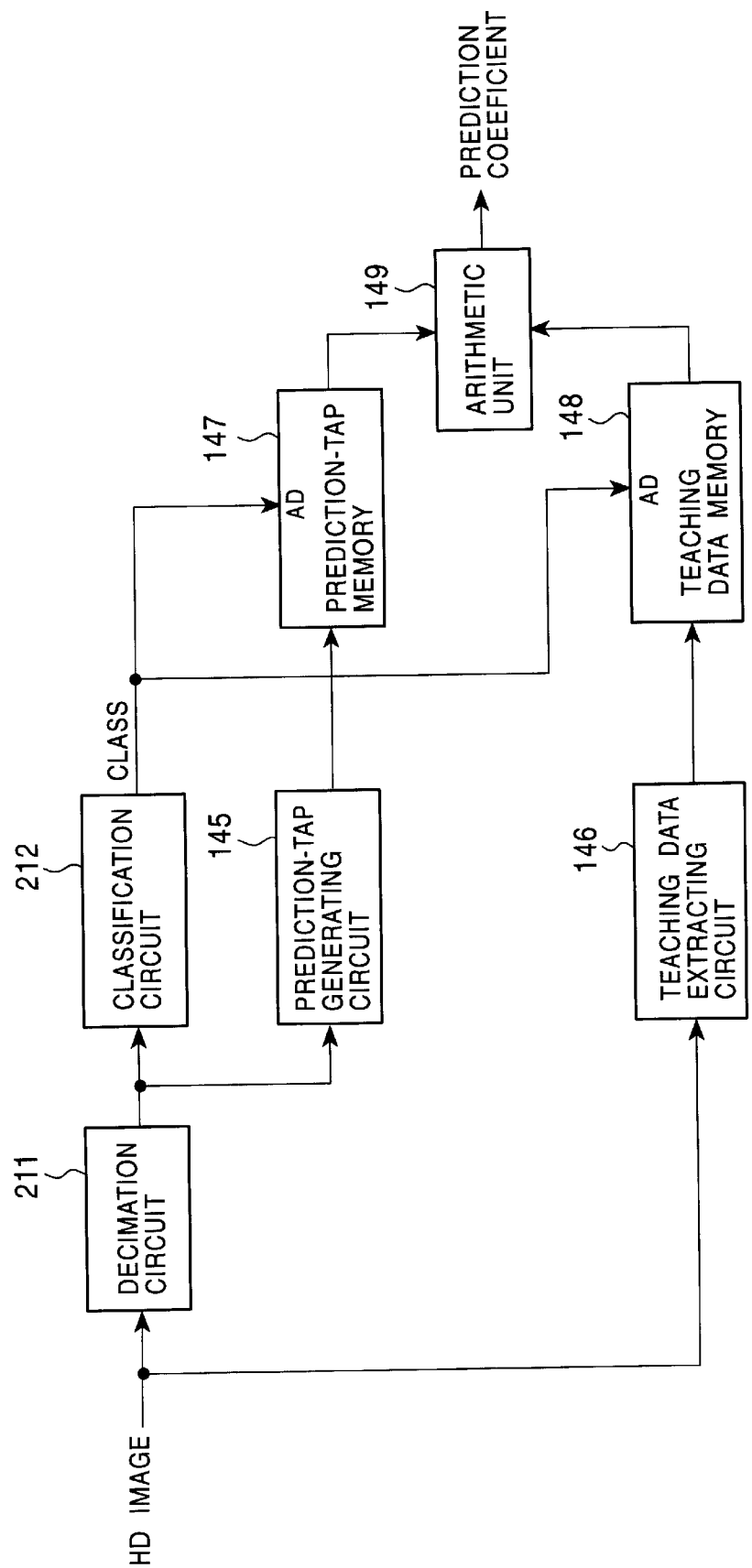
FIG. 17 is a block diagram showing one example of a learning apparatus for performing learning concerning prediction coefficients to be stored in the coefficient ROM 207 in FIG. 12.

Next, FIG. 11 shows a block diagram of a learning apparatus that performs learning for computing prediction coefficients for classes to be stored in the coefficient ROM 123 in FIG. 9. In the figure, components corresponding to those in FIG. 17 are denoted by identical reference numerals.

An HD image to be teaching data y in learning is supplied to a decimation circuit $141_1$ and the teaching data extracting circuit 146. The decimation circuit $141_1$ uses a manner similar to, for example, the storage unit in FIG. 2 (similarly to the generating of the second hierarchical SD image from the first hierarchical SD image in the storage unit in FIG. 2), whereby forming a first hierarchical SD image having half the number of horizontal or vertical pixels as the HD image. The first hierarchical SD image is supplied to a decimation circuit $141_2$, a multihierarchical classification unit 144 and a predicted-tap generating circuit 145.

Also the decimation circuit $141_2$ forms a second hierarchical SD image having half the number of horizontal or vertical pixels as the first SD image, similarly to the decimation circuit $141_1$. The second hierarchical SD image is supplied to a decimation circuit $141_3$ and a multihierarchical classification unit 144. Also the decimation circuit $141_3$ forms a third hierarchical SD image having half the number of horizontal or vertical pixels as the second hierarchical SD image, similarly to decimation circuit $141_3$. The third hierarchical SD image is supplied to the multihierarchical classification unit 144.

The multihierarchical classification unit 144 has a structure as same as the multihierarchical classification unit 104 shown in FIG. 7 or FIG. 10, and uses the first to third hierarchical images, which are supplied, to perform the above-described classification (multihierarchical classification). Classes as the classification results are supplied to the address terminals (AD) of a prediction tap memory 147 and a teaching data memory 148.

The prediction-tap generation circuit 145 performs processing similar to that by the prediction-tap generating circuit 121 in FIG. 9, whereby using the first hierarchical SD image from the decimation circuit $141_1$ to form a prediction tap for finding predicted values based on the reference pixels. The prediction tap is supplied to a prediction-tap memory 147.

In the prediction-tap memory 147, the prediction tap supplied from the predicted-tap generating circuit 145 is stored at an address corresponding to the class supplied from the multihierarchical classification unit 144.

In addition, a teaching data extracting circuit 146 extracts from the supplied HD image, HD pixels to be used as reference pixels in the multihierarchical classification unit 144 and the prediction-tap generating circuit 145, and supplies them as teaching data to a teaching data memory 148.

In teaching data memory 148, the teaching data supplied from the teaching-data extracting circuit 146 are stored at an address corresponding to the class supplied from the multihierarchical classification unit 144.

The foregoing processing is performed with all HD pixels constituting all predetermined HD images prepared for learning successively used as reference pixels.

As a result, at an identical address of the teaching data memory 148 or the prediction-tap memory 147, HD pixels in the class corresponding to the address, or SD pixels positioned so as to form the prediction taps described in FIG. 13 to FIG. 16 as to the HD pixels, are stored as teaching data y or learning data x.

Subsequently, an arithmetic unit 149 reads the prediction tap as learning data or the HD pixels as teaching data stored at the identical address from the prediction tap memory 147 or the teaching data memory 148, and uses them to compute a set of prediction coefficients for minimizing the error between the predicted value and the teaching data by using, for example, least squares. In other words, the arithmetic unit 149 makes normal equations as shown in equation (7) for classes, and solves them to find the set of prediction coefficients.

In the above-described manner, sets of prediction coefficients for classes, found by the arithmetic unit 149, are stored at the addresses corresponding to the classes of the coefficient ROM 123.

In the embodiment in FIG. 7, the selection circuit 112 selects any one of the first to third hierarchical SD images, and the class-tap generating circuit 113 uses the one hierarchical image to form class taps. In addition, by, for example, causing the selection circuit 112 to select two of the first to third SD images, the class-tap generating circuit 113 can use the two hierarchical levels to form class taps. In this case, by causing the classification circuit 114 to classify the respective class taps formed by the two hierarchical levels, the two classification results may be combined to one in the combining circuit 115.

In this embodiment, among the first to third hierarchical SD images, the first hierarchical image, which has the largest number of pixels, is used to form prediction taps. However, two or more of the first to third hierarchical images may be used to form prediction taps.

In this embodiment, in the storage unit in FIG. 2, the second hierarchical memory 3 and the third hierarchical memory 4 are accessed by giving part of horizontal address HA and vertical address VA to be given to the first hierarchical memory 2. The second hierarchical memory 3 and the third hierarchical memory 4 can be accessed by giving a peculiar (independent) address different from horizontal address HA and vertical address VA to be given to the first hierarchical memory.

In this embodiment, in the storage unit in FIG. 2, the first hierarchical memory 2, the second hierarchical memory 3, and the third hierarchical memory 4 are accessed by giving a horizontal address or a vertical address corresponding to the horizontal positions or vertical positions of pixels constituting the SD image. However, the first hierarchical memory 2, the second hierarchical memory 3 and the third hierarchical memory 4 can be accessed by giving an address corresponding to, for example, the time direction. In this case, the second and third pixels are formed by adding not only the first hierarchical pixels distributed in the horizontal and vertical spatial directions but also the first hierarchical pixels distributed in the time direction.

Similarly, the class taps and the prediction taps can be formed using not only the SD pixels distributed in the spatial direction but also the SD pixels distributed in the time direction.

In addition, each of the first hierarchical memory 101, the second hierarchical memory 102 and the third hierarchical memory 103, in FIG. 1, and the first hierarchical memory 2, the second hierarchical memory 3 and the third hierarchical memory 4, in FIG. 2, does not need to be one physical memory but all of them can be formed as one memory. In this case, the storage areas of one memory can be respectively assigned to the first hierarchical memory 101, the second hierarchical memory 102 and the third hierarchical memory 103, and the first hierarchical memory 2, the second hierarchical memory 3 and the third hierarchical memory 4.

In this embodiment, in FIG. 2, the address supply circuit 1, the first hierarchical memory 2, the second hierarchical memory 3, the third hierarchical memory 4, and the RMW circuit 5, all, are formed on one chip. However, they do not always need to be formed on one chip.

In this embodiment, bits assigned to a first hierarchical pixel are eight bits, and each data length of a memory cell in the first hierarchical memory 2, the second hierarchical memory 3 or the third hierarchical memory 4 is eight, ten or twelve bits so that no overflow occurs in the first to third hierarchical pixels. However, the data length of memory cells in the first hierarchical memory 2, the second hierarchical memory 3 and the third hierarchical memory 4 can be uniformly set at, for example, eight bits. In this case, concerning the second or third pixels, values obtained by omitting the lower two bits of sums of 2×2 first or second hierarchical pixels (since these values correspond to quotients obtained by dividing the sums, they are averages) are stored, respectively. Accordingly, overflow occurs, which loses data reversibility.

The present invention can be applied to either of an image having been scanned by non-interlaced scanning and an image having been scanned by interlaced scanning.

In this embodiment, the number of hierarchical levels of SD images is three. However, the of hierarchical levels may be two, or four or more.

In this embodiment, the sum of four (2×2) lower level SD pixels is used as an SD pixel (pixel level) at one higher hierarchical level. However, a technique for forming higher hierarchical SD pixels is not limited to that.

The present invention is realized by hardware or using a computer to execute a program for performing the above-described processing.

In this embodiment, pixels (pixel levels) are stored in a memory represented by a random access memory (RAM). However, the pixels can be stored (recorded) in recording media such as a magnetic disc, a magneto-optical disc, a magnetic tape and an optical card.

In addition, the image processing apparatus in FIG. 1 and the storage unit in FIG. 2 can be formed as not only separate units but also one integrated unit.

The present invention can be applied to not only the case where an SD image is converted into an HD image, but also, for example, the case where an image is enlarged.

The positional relationship of SD pixels for forming class taps and prediction taps is not limited to the above-described embodiment.

The present invention may be variously modified and applied within its spirit and scope. Therefore, the subject matter of the present invention is not limited to the foregoing embodiments.

What is claimed is:

1. An image processing apparatus for performing processing for generating a relatively high resolution first image by using a corresponding lower resolution second image having a smaller number of pixels per unit area than said first image and a corresponding third image having a smaller number of pixels per unit area than said second image, said image processing apparatus comprising:

a receiving unit for receiving said second and third images;

a classification unit for classifying reference pixels of the first image into respective predetermined classes each defined by a class tap representing a plurality of pixels of said second or third image in the vicinity of the respective reference pixel, in accordance with properties of pixels of said second or third image corresponding to the reference pixels; and a prediction unit for predicting values for the reference pixels of said first image in accordance with the respective classes of the reference pixels.

2. An image processing apparatus according to claim 1, wherein said prediction unit includes: a prediction coefficient memory for storing prediction coefficients for using linear coupling of pixels of said second or third image to compute the predicted values based on the reference pixels so as to correspond to the classes; and a predicted-value computing unit for finding the predicted values for the reference pixels from said prediction coefficients based on the classes of the reference pixels and the pixels of said second or third image.

3. An image processing apparatus according to claim 1, wherein said classification unit includes: an activity detector for detecting activities in portions of said second or third image corresponding to the reference pixels; and a selector for selecting said second or third image, based on the activities, and among pixels constituting the image selected by said selector, pixels corresponding to the reference pixels are used to perform the classification.

4. An image processing apparatus according to claim 1, wherein said classification unit performs the classification by using pixels corresponding to the reference pixels among the pixels constituting said second or third image, and said classification unit includes a combining unit for combining the classification results obtained by using each of said second or third image so that final classification results are formed.

5. An image processing method for performing processing for generating a relatively high resolution first image by using a corresponding lower resolution second image having a smaller number of pixels per unit area than said first image and a corresponding third image having a smaller number of pixels per unit area than said second image, said image processing method comprising the steps of:

receiving said second and third images; and classifying reference pixels of said first image into respective predetermined classes each defined by a class tap representing a plurality of pixels of said second or third image in the vicinity of the respective reference pixel, in accordance with properties of pixels of said second or third image corresponding to the reference pixels; and predicting values for said reference pixels of the first image in accordance with their respective classes.

6. An image processing method according to claim 5, wherein the predicted-value finding step includes storing prediction coefficients for using linear coupling of pixels of said second or third image to compute the predicted values based on the reference pixels so as to correspond to the classes, and finding the predicted values for the reference pixels from said prediction coefficients based on the classes of the reference pixels and the pixels of said second or third image.

7. An image processing method according to claim 5, wherein the classification step includes detecting activities in portions of said second or third image corresponding to the reference pixels, and a step of selecting said second or third image, based on the activities, and among pixels constituting the selected image, pixels corresponding to the reference pixels are used to perform the classification.

8. An image processing method according to claim 5, wherein, in the classification step, the classification using pixels corresponding to the reference pixels among the pixels constituting said second or third image is performed, and the classification results obtained by using said second or third image are combined to form final classification results.

9. An image processing apparatus according to claim 1, wherein said second image is an SD image and said first image is an HD image having four times as many pixels per unit area as said SD image.

10. An image processing apparatus according to claim 1, wherein said second image is a first hierarchical image, said third image is a second hierarchical image, and said processing apparatus further generates a third hierarchical image having a smaller number of pixels per unit area than said second hierarchical image, said classification unit classifying said reference pixels of the first image into predetermined classes in accordance with properties of pixels of at least one of said first, second and third hierarchical images.

11. An image processing apparatus according to claim 1, wherein a class tap for a reference pixel represents a plurality of pixels of said second or third image surrounding said reference pixel.

12. An image processing apparatus according to claim 1, wherein said first and second images have common pixels.

13. An image processing method according to claim 5, wherein said second image is an SD image and said first image is an HD image having four times as many pixels per unit area as said SD image.

14. An image processing method according to claim 5, wherein said second image is a first hierarchical image, said third image is a second hierarchical image, and said image processing method further includes generating a third hierarchical image having a smaller number of pixels per unit area than said second hierarchical image, and said reference pixels of the first image being classified into predetermined classes in accordance with properties of pixels of at least one of said first, second and third hierarchical images.

15. An image processing method according to claim 5, wherein a class tap for a reference pixel represents a plurality of pixels of said second or third image surrounding said reference pixel.

16. An image processing method according to claim 5, wherein said first and second images have common pixels.

17. An image processing apparatus according to claim 1, wherein said classification unit includes a combining unit that combines at least a first hierarchical class defined by said class tap representing a plurality of pixels of said second image, and a second hierarchical class defined by said class tap representing a plurality of pixels of said third image, to generate a final class for a reference pixel of said first image.

18. An image processing apparatus according to claim 17, wherein said combining unit combines said first hierarchical class with said second hierarchical class and a third hierarchical class, said third hierarchical class being defined by a class tap representing a plurality of pixels of a fourth image having a smaller number of pixels per unit area than said third image, to generate the final class for a reference pixel of said first image.

19. An image processing apparatus according to claim 18, wherein said combining unit uses values representing said first, second and third hierarchical classes as upper bits, intermediate bits and lower bits, respectively, to form the final class as one bit string.

20. An image processing method according to claim 5, wherein said classifying step includes the sub-step of combining at least a first hierarchical class defined by said class tap representing a plurality of pixels of said second image, and a second hierarchical class defined by said class tap representing a plurality of pixels of said third image, to generate a final class for a reference pixel of said first image.

21. An image processing method according to claim 20, wherein said sub-step of combining combines said first hierarchical class with said second hierarchical class and a third hierarchical class, said third hierarchical class being defined by a class tap representing a plurality of pixels of a fourth image having a smaller number of pixels per unit area than said third image, to generate the final class for a reference pixel of said first image.

22. An image processing method according to claim 21, wherein said sub-step of combining uses values representing said first, second and third hierarchical classes as upper bits, intermediate bits and lower bits, respectively, to form the final class as one bit string.

* * * * *